US012736964B2

(12) United States Patent
Byun et al.

(10) Patent No.: US 12,736,964 B2
(45) **Date of Patent: *Sep. 15, 2026**

(54) ELECTRONIC APPARATUS AND CONTROLLING METHOD THEREOF

(71) Applicant: SAMSUNG ELECTRONICS CO., LTD., Suwon-si (KR)

(72) Inventors: Dongnam Byun, Suwon-si (KR); Hyewon Kim, Seoul (KR); Haedong Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

This patent is subject to a terminal disclaimer.

(21) Appl. No.: 18/802,591

(22) Filed: Aug. 13, 2024

(65) Prior Publication Data

US 2024/0402707 A1 Dec. 5, 2024

Related U.S. Application Data

(63) Continuation of application No. 18/179,135, filed on Mar. 6, 2023, now Pat. No. 12,078,998, which is a (Continued)

(30) Foreign Application Priority Data

Jul. 9, 2019 (KR) ........................ 10-2019-0082781
Oct. 28, 2019 (KR) ........................ 10-2019-0134855

(51) Int. Cl.
*G05D 1/00* (2024.01)
*G05D 1/227* (2024.01)
(Continued)

(52) U.S. Cl.
CPC ......... *G05D 1/0221* (2013.01); *G05D 1/0088* (2013.01); *G05D 1/0238* (2013.01);
(Continued)

(58) Field of Classification Search
CPC ...... G05D 1/0221; G05D 1/227; G05D 1/628; G05D 1/246; G05D 1/0088; G05D 1/0238;
(Continued)

(56) References Cited

U.S. PATENT DOCUMENTS 6,456,728 B1 * 9/2002 Doi ........................... G06T 7/70 348/169
8,218,874 B2 * 7/2012 Boncyk .............. G06Q 30/0641 382/181
(Continued)

FOREIGN PATENT DOCUMENTS

CN 109890575 A 6/2019
JP 2005-322002 A 11/2005
(Continued)

OTHER PUBLICATIONS

Communication dated May 29, 2025 issued by the China National Intellectual Property Administration in Chinese Patent Application No. 202080045767.X.
(Continued)

*Primary Examiner* — Gertrude Arthur Jeanglaude
(74) *Attorney, Agent, or Firm* — Sughrue Mion, PLLC

(57) ABSTRACT

Provided is an electronic apparatus, including: a sensor; a camera; a storage configured to store first and second artificial intelligence models; a first processor; and a second processor. The second processor is configured to: input an image obtained through the camera to the first artificial intelligence model and identify the object of the first type in the image, and input the image obtained through the camera to the second artificial intelligence model and identify the object of the second type, at least a part of which is not viewable in the image. The first processor is configured to: determine a distance between the object of the first type and the object of the second type based on sensing data received
(Continued)

from the sensor; and control the electronic apparatus to travel based on the determined distance.

16 Claims, 20 Drawing Sheets

Related U.S. Application Data continuation of application No. 16/924,482, filed on Jul. 9, 2020, now Pat. No. 11,599,114.

(51) Int. Cl.
*G05D 1/246* (2024.01)
*G05D 1/628* (2024.01)
*G06F 18/22* (2023.01)
*G06N 3/08* (2023.01)
*G06V 10/44* (2022.01)
*G06V 10/764* (2022.01)
*G06V 10/82* (2022.01)
*G06V 20/10* (2022.01)
*G06V 20/58* (2022.01)

(52) U.S. Cl.
CPC ........... *G05D 1/0274* (2013.01); *G05D 1/227* (2024.01); *G05D 1/246* (2024.01); *G05D 1/628* (2024.01); *G06F 18/22* (2023.01); *G06N 3/08* (2013.01); *G06V 10/454* (2022.01); *G06V 10/764* (2022.01); *G06V 10/82* (2022.01); *G06V 20/10* (2022.01); *G06V 20/58* (2022.01)

(58) Field of Classification Search
CPC ...... G06V 20/58; G06V 10/454; G06V 10/82; G06V 20/10; G06V 10/764; G06F 18/22
See application file for complete search history.

(56) References Cited

U.S. PATENT DOCUMENTS 8,781,629 B2 * 7/2014 Ota ........................ B25J 9/1671 700/258
8,818,703 B2 * 8/2014 Harada .................. G08G 1/166 701/1
9,452,754 B2 9/2016 Clarke et al.
9,646,226 B2 5/2017 Wang et al.
9,767,610 B2 9/2017 Takeuchi
9,944,317 B2 4/2018 Lee
11,150,666 B2 10/2021 Noh et al.
11,599,114 B2 3/2023 Byun et al.
12,078,998 B2 * 9/2024 Byun ................... G05D 1/0238
2012/0011142 A1 * 1/2012 Baheti .................. G06V 10/462 707/769
2015/0302645 A1 10/2015 Takeuchi
2016/0374526 A1 12/2016 Yang et al.
2017/0161592 A1 6/2017 Su et al.
2017/0178352 A1 6/2017 Harmsen et al.
2017/0262750 A1 9/2017 Kozuka et al.
2019/0087695 A1 3/2019 Inoue
2019/0130218 A1 5/2019 Albright et al.
2019/0179333 A1 6/2019 Noh et al.
2019/0196495 A1 6/2019 Noh et al.
2019/0197673 A1 6/2019 Jung et al.

FOREIGN PATENT DOCUMENTS

JP 6064544 B2 1/2017
JP 2017-162438 A 9/2017
KR 10-2018-0023301 A 3/2018
KR 10-2019-0046201 A 5/2019
KR 10-2019-0054782 A 5/2019
KR 10-2019-0078543 A 7/2019
KR 10-2070067 B1 1/2020
WO 2019132518 A1 7/2019

OTHER PUBLICATIONS

Communication dated Jun. 13, 2025 issued by the European Patent Office in European Patent Application No. 20837148.4.
Communication dated Sep. 28, 2020, issued by the International Searching Authority in counterpart International Application No. PCT/KR2020/008935 (PCT/ISA/210 and PCT/ISA/237).
Communication issued Aug. 20, 2020, issued by the Korean Patent Office in counterpart Korean Patent Application No. 10-2019-0134855.
Communication dated Apr. 28, 2022, issued by the European Patent Office in counterpart European Application No. 20837148.4.
Communication dated Feb. 26, 2021, issued by the Korean Patent Office in counterpart Korean Patent Application No. 10-2019-0134855.
E. Osherov and M. Lindenbaum, "Increasing CNN Robustness to Occlusions by Reducing Filter Support," 2017 IEEE International Conference on Computer Vision (ICCV), 2017, pp. 550-561, doi: 10.1109/ICCV.2017.67.
European Extended Search Report issued Nov. 13, 2023 issued by the European Patent Office for EP Patent Application No. 20837148.4.
Communication dated Dec. 8, 2025, issued by the China National Intellectual Property Administration in Chinese Application No. 202080045767.X.
Communication dated Mar. 3, 2026, issued by the China National Intellectual Property Administration in Chinese Application No. 202080045767.X.
Communication dated Jul. 15, 2026, issued by the European Patent Office in European Application No. 20837148.4.

* cited by examiner

ELECTRONIC APPARATUS AND CONTROLLING METHOD THEREOF

CROSS-REFERENCE TO RELATED APPLICATIONS

This application is a continuation application of U.S. application Ser. No. 18/179,135 filed Mar. 6, 2023, which is a continuation application of U.S. application Ser. No. 16/924,482 filed Jul. 9, 2020, issued as U.S. Pat. No. 11,599,114 on Mar. 7, 2023, which claims priorities from Korean Patent Application No. 10-2019-0082781, filed on Jul. 9, 2019, and Korean Patent Application No. 10-2019-0134855, filed on Oct. 28, 2019, in the Korean Intellectual Property Office, the disclosures of which are herein incorporated by references in their entireties.

BACKGROUND

1. Field

Example embodiments of the disclosure relate to an electronic apparatus and a controlling method thereof, and more particularly, to an electronic apparatus capable of identifying an object of a certain type and a controlling method thereof.

2. Description of Related Art

Recently, various electronic apparatuses have been developed with the development of electronic technologies. In particular, an electronic apparatus that identifies an object around the electronic apparatus and travels while avoiding the object is being developed in recent years. For example, a recently developed robot cleaner may identify a cup placed on the floor and travel by avoiding the cup to prevent a collision with the cup.

In some cases, an object may be partially blocked by another object. For example, a part of a cup may be blocked by a leg of a table. In this case, the conventional electronic apparatus may not be able to identify the cup, leading to a collision with the cup.

SUMMARY

According to an aspect of an example embodiment, there is provided an electronic apparatus, including: a sensor; a camera; a storage configured to store a first artificial intelligence model trained to identify an object of a first type included in an image and a second artificial intelligence model trained to identify an object of a second type, at least a part of which is not viewable in the image; a first processor connected to the sensor and the storage; and a second processor connected to the camera, the storage, and the first processor. The second processor is configured to: load the first artificial intelligence model and the second artificial intelligence model from the storage; and input an image obtained through the camera to the first artificial intelligence model and identify the object of the first type in the image, input the image obtained through the camera to the second artificial intelligence model and identify the object of the second type, at least a part of which is not viewable in the image, and transmit information regarding the identified object of the first type and information regarding the identified object of the second type to the first processor. The first processor is configured to: determine a distance between the object of the first type and the object of the second type based on first sensing data received from the sensor; and control the electronic apparatus to travel based on the determined distance.

According to an aspect of an example embodiment, there is provided a method of controlling an electronic apparatus, the method including: obtaining an image through a camera; inputting an image obtained through the camera to a first artificial intelligence model and identifying an object of a first type in the image; inputting the image obtained through the camera to a second artificial intelligence model and identifying an object of a second type, at least a part of which is not viewable in the image; determining a distance between the object of the first type and the object of the second type based on first sensing data received from a sensor; and controlling the electronic apparatus to travel based on the determined distance.

According to an aspect of an example embodiment, there is provided an apparatus for controlling an electronic device, including: at least one memory configured to store program code; and at least one processor configured to read the program code and operate as instructed by the program code, the program code including: code configured to cause at least one of the at least one processor to load a first artificial intelligence model and a second artificial intelligence model; code configured to cause at least one of the at least one processor to input an image obtained through a camera to the first artificial intelligence model and identify an object of a first type in the image, input the image obtained through the camera to the second artificial intelligence model and identify an object of a second type, at least a part of which is not viewable in the image; code configured to cause at least one of the at least one processor to determine a distance between the object of the first type and the object of the second type based on first sensing data received from a sensor; and code configured to cause at least one of the at least one processor to control a movable range of the electronic device based on the determined distance.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
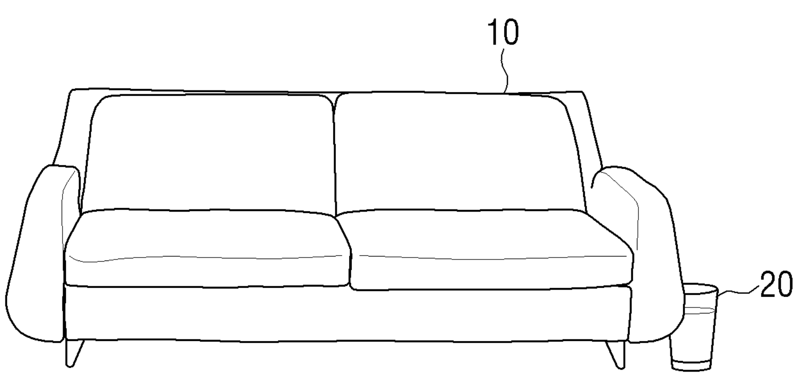
FIG. 1 is a schematic view provided to explain an operation of an electronic apparatus according to an embodiment.
Figure 1:
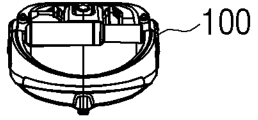

Hereinafter, example embodiments of the disclosure will be described in detail with reference to the accompanying drawings.

General terms have been selected in consideration of functions of the disclosure as terms used in the specification and the claims. However, these terms may be changed depending on an intention of those skilled in the art, legal or technical interpretation, the emergence of a new technology, and the like. In addition, some terms are terms arbitrarily selected by an applicant. These terms may be interpreted in the meanings defined herein, and may be interpreted based on a general content of the specification and usual technical knowledge in the art as long as they are not specifically defined.

In addition, in describing the disclosure, when it is determined that detailed descriptions of related known functions or configurations may unnecessarily obscure the subject matter of the disclosure, detailed descriptions thereof are abbreviated or omitted.

It will be understood that, although the terms first, second, etc. may be used herein to describe various elements, these elements should not be limited by these terms. These terms are only used to distinguish one element from another. Any references to a singular element may include plural elements unless expressly stated otherwise.

In the present specification, it should be understood that the terms, such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Further, components that will be described in the specification are discriminated merely according to functions mainly performed by the components. That is, two or more components which will be described later may be integrated into a single component. Furthermore, a single component which will be explained later may be separated into two or more components. Moreover, each component which will be described may additionally perform some or all of a function executed by another component in addition to the main function thereof. Some or all of the main function of each component which will be explained may be carried out by another component. Each component (e.g., "unit" or "module") described herein may be implemented as hardware, software, or a combination of both.

As used herein, the term "and/or" includes any and all combinations of one or more of the associated listed items. Expressions such as "at least one of," when preceding a list of elements, modify the entire list of elements and do not modify the individual elements of the list. For example, the expression "at least one of a, b, and c," should be understood as including only a, only b, only c, both a and b, both a and c, both b and c, or all of a, b, and c.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be generated via a training process. The predefined operation rules or AI model may, for example, be set to perform desired characteristics (or purpose) generated by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Furthermore, embodiments of the disclosure will be described in detail with reference to the accompanying drawings and the contents described in the accompanying drawings, but the disclosure is not limited or limited by the embodiments.

The disclosure relates to an electronic apparatus capable of identifying a dangerous object partially covered by another object and travelling by avoiding the dangerous object and a controlling method thereof. It should be understood that the term “dangerous object” is used herein to refer to any type of an object that needs to be avoided during traveling of an electronic apparatus, and the “dangerous object” is not limited to any specific type, structure, material or composition of an object.

FIG. 1 is a schematic view provided to explain an operation of an electronic apparatus according to an embodiment.

An electronic apparatus 100 may obtain an image through a camera provided in the electronic apparatus 100 while travelling in an indoor space. Here, the image captured through a camera may include various objects such as a sofa, a television (TV), a bed, a table, a wardrobe, an air conditioner, a refrigerator, or the like.

In addition, the image captured through a camera may include a dangerous object. Here, the dangerous object is an object that may be damaged by a collision with the electronic apparatus 100, and may be, for example, a fragile object such as a cup, a flower pot, or the like. However, this is only an example, and the dangerous object may be any other types of an object. In another example, the dangerous object may be an object that may be stuck in an inlet of the electronic apparatus 100, and may be socks, earphones, wires, or the like. The dangerous object may also be an object that may contaminate the indoor space such as animal wastes, or the like. That is, the dangerous object may include any type of an object as long as it is desirable to avoid the dangerous object while traveling of the electronic apparatus.

In other words, the object may be of a first type which may be contacted by or closely approached by the electronic apparatus 100, and the dangerous object may be of a second type that may not be contacted or closely approached by the electronic apparatus 100. For ease of description, the object of the first type will be referred to as the “object” and the object of the second type will be referred to as the “dangerous object”, but the these terms should be defined not by the simple names of the terms but by the meaning of the terms and the contents throughout the disclosure.

The electronic apparatus 100 may identify an object and/or a dangerous object included in an image.

Specifically, the electronic apparatus 100 may identify an object included in an image by inputting the image obtained through a camera to a first artificial intelligence model that performs object identification, and may identify a dangerous object included in the image by inputting the image obtained through a camera to a second artificial intelligence model that performs dangerous object identification.

Here, the first artificial intelligence model is a model trained to identify an image such as a sofa, a TV, a bed, a table, a wardrobe, an air conditioner, a refrigerator, etc. included in the image, and the second artificial intelligence model is a model trained to identify a dangerous object such as a cup, socks, etc. included in the image. Each of the first and second artificial intelligence models may be implemented as a Convolutional Neural Network (CNN).

The electronic apparatus 100 may control driving of the electronic apparatus 100 based on whether an object and/or a dangerous object is included in the image.

Specifically, if an object is included in the image, the electronic apparatus 100 may travel close to the object. Here, traveling in close proximity to the object may be traveling in an area spaced apart from the object by a first predetermined distance. For example, if the first predetermined distance is set to 1 cm, the electronic apparatus 100 may travel as close as 1 cm from the object.

Alternatively, traveling in close proximity may be traveling until a contact with an object is made. For example, if an object is included in an image, the electronic apparatus 100 may travel toward the object until the object is touched, and change the traveling direction when the object is contacted.

If a dangerous object is included in the image, the electronic apparatus 100 may travel while avoiding the dangerous object. Here, traveling by avoiding the dangerous object may be traveling in an area spaced apart from the dangerous object by a second predetermined distance or greater.

The second predetermined distance may be greater than the first predetermined distance described above. For example, the second predetermined distance may be set to 30 cm, in which case the electronic apparatus 100 may travel close to an area 30 cm away from the dangerous object, and when the distance between the electronic apparatus 100 and the dangerous object reaches the second predetermined distance, the traveling direction of the electronic apparatus 100 may be changed such that the electronic apparatus 100 is away from the dangerous object by the second predetermined distance or greater.

Accordingly, if an object such as a sofa is identified in an image, the electronic apparatus may travel close to the sofa, and if a dangerous object such as a cup is identified in the image, the electronic apparatus may travel by avoiding the cup.

In some cases, a part of a dangerous object may be blocked by an object in the image. For example, referring to FIG. 1, a cup 20 which is a dangerous object may be partially blocked by a sofa 10 which is an object.

In this case, a conventional electronic apparatus may not identify the dangerous object blocked by the object and thus, may travel close to the object. As a result, the conventional electronic apparatus may contact or collide with the dangerous object while traveling close to the object and encounter a problem such as destroying the dangerous object.

In order to prevent such a problem, the electronic apparatus according to an embodiment the disclosure may identify a dangerous object partially blocked by another object and travel while avoiding the dangerous object, which will be described in detail with reference to FIG. 2. For illustrative purposes, the following descriptions are made with respect to an embodiment in which the dangerous object is partially blocked by another object. However, the disclosure is not limited thereto, and the disclosure may apply to any case where a dangerous object is not entirely viewable in the image (e.g., a portion of the dangerous object is cut out from the image).

Figure 2:
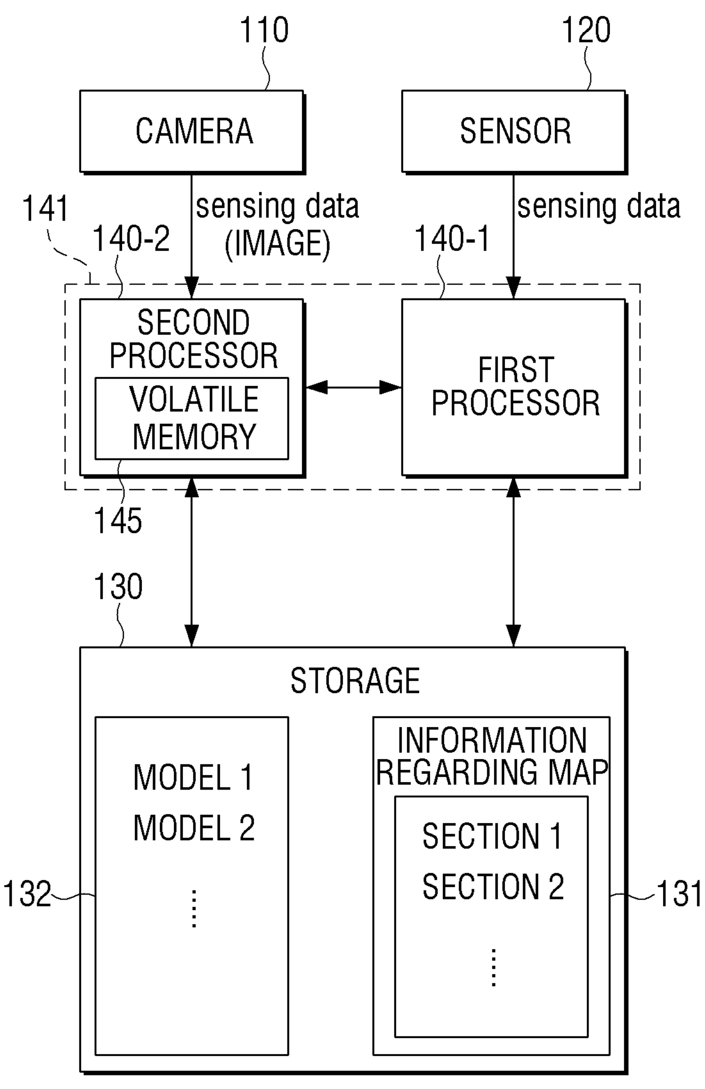
FIG. 2 is a block diagram provided to explain an electronic apparatus according to an embodiment.

FIG. 2 is a block diagram provided to explain an electronic apparatus according to an embodiment.

The electronic apparatus 100 according to an embodiment may be a movable electronic apparatus. For example, the electronic apparatus 100 may be one of a robot cleaner capable of performing cleaning while traveling in a space in a home, an automatic driving vehicle performing driving on behalf of a person, or an automatic guided vehicle capable of moving goods to a destination.

However, the electronic apparatus 100 is not limited thereto, and the electronic apparatus may be implemented as various electronic apparatuses that are movable in a space, and include examples such as a robot capable of performing air purification while traveling in a space in a building, a housework supporting robot capable of performing tasks such as organizing clothes, washing dishes, etc., or a security robot capable of performing security while traveling in a space in the building.

In addition, the electronic apparatus 100 may be implemented as a device that may be connected or attached to any one of the above-described movable electronic apparatus.

Referring to FIG. 2, the electronic apparatus 100 according to an embodiment includes a camera 110, a sensor 120, a storage 130, and a processor 140. Here, the processor 140 may include a first processor 140-1 connected with the sensor 120, the storage 130 and a second processor 140-2 connected with the camera 110, the storage 130 and the first processor 140-1.

The first processor 140-1 may be a general-purpose processor such as a central processing unit (CPU), an application processor (AP), etc. or a graphics-only processor such as a the graphics processing unit (GPU), a visual processing unit (VPU), etc., and the second processor 140-2 may be an artificial intelligence (AI) processor such as a neural processing unit (NPU), but is not limited thereto.

The second processor 140-2 may obtain an image through the camera 110. Specifically, the second processor 140-2 may control the camera 110 to perform photographing, and obtain an image captured by the camera 110 from the camera 110. Here, the photographing may be performed not only when the electronic apparatus 100 is traveling but also when the electronic apparatus 100 is stopped (e.g., stationary state). The camera 110 may be implemented as an RGB camera, but is not limited thereto.

The second processor 140-2 may identify an object and/or a dangerous object based on the image obtained through the camera 110.

Specifically, the second processor 140-2 may load first and second artificial intelligences models 132 stored in the storage 130 onto a volatile memory 145 of the second processor 140-2, identify an object included in the image by inputting the image obtained through the camera 110 to the first artificial intelligence model that performs object identification, and identify a dangerous object included in the image by inputting the image obtained through the camera 110 to the second artificial intelligence model that performs dangerous object identification.

Here, the first artificial intelligence model may be a model trained to identify an object such as a sofa, a TV, a bed, a table, a wardrobe, an air conditioner, a refrigerator, etc. included in the image. For example, the first artificial intelligence model may be a Convolutional Neural Network (CNN) including a fully-connected layer trained to identify an object included in an image based on a convolutional layer extracting feature information of the image and the extracted feature information, when the image including a sofa, a TV, a bed, a table, a wardrobe, an air conditioner, a refrigerator, etc. is input.

The second artificial intelligence model may be a model trained to identify a dangerous object (e.g., a cup, a flower pot, socks, animal wastes, etc.) included in an image. For example, the second artificial intelligence model may be a CNN including a fully-connected layer trained to identify a dangerous object included in an image based on a convolutional layer that extracts feature information of the image and the extracted feature information corresponding to the dangerous object included in the image that is input.

In addition, the second artificial intelligence model may be a model trained to identify a dangerous object that is partially blocked by another object. For example, the second artificial intelligence model may be a CNN including a fully-connected layer trained to identify a dangerous object that is included in an image and partially blocked by another object, based on a convolutional layer that extracts feature information of the image and the extracted feature information corresponding to the dangerous object that is partially blocked by another object included in the image that is input. This will be described in detail later with reference to FIGS. 6A to 6C.

The second processor 140-2 may transmit information regarding an identified object and/or an identified dangerous object to the first processor 140-1.

The first processor 140-1 may determine whether an object and/or a dangerous object is included in an image. Specifically, based on information regarding an object being received from the second processor 140-2, the first processor 140-1 may determine that the object is included in the image, and based on information regarding a dangerous object being received from the second processor 140-2, the first processor 140-1 may determine that the dangerous object is included in the image.

Based on whether an object and/or a dangerous object is included in an image, the first processor 140-1 may control traveling of the electronic apparatus 100.

Specifically, if an object is included in an image, the first processor 140-1 may control a driver (not illustrated) of the electronic apparatus 100 to allow the electronic apparatus 100 to travel in close proximity to the object. Here, the driver may be implemented as a wheel, an electric motor, or a chain capable of moving the electronic apparatus 100, but is not limited thereto. The driver may be implemented in various forms as long as the driver may provide a driving power that is used to move the electronic apparatus 100.

Traveling in close proximity may be traveling in an area spaced apart from an object by the first predetermined distance. For example, if the first predetermined distance is set to 1 cm, the first processor 140-1 may control the driver so that the electronic apparatus 100 is allowed to travel close to an area that is 1 cm away from the object.

Alternatively, traveling in close proximity may be traveling until an object is contacted by the electronic apparatus 100. For example, if an object is included in an image, the first processor 140-1 may control the driver such that the electronic apparatus 100 is allowed to travel toward the object until the electronic apparatus 100 contacts the object, and when the electronic apparatus 100 contacts the object, the first processor 140-1 may control the driver to change the traveling direction of the electronic apparatus 100.

If a dangerous object is included in the image, the first processor 140-1 may control the driver so that the electronic apparatus 100 travels by avoiding the dangerous object. Here, traveling by avoiding the dangerous object may be traveling in an area spaced apart from the dangerous object by the second predetermined distance.

The second predetermined distance may be greater than the above-described first predetermined distance. For example, the second predetermined distance may be set to 30 cm, in which case, the first processor 140-1 may control the driver such that the electronic apparatus 100 is allowed to travel close to the dangerous object up to an area 30 cm away from the dangerous object. When the distance between the electronic apparatus 100 and the dangerous object reaches the second predetermined distance, the first processor 140-1 may control the driver so that the electronic apparatus 100 changes the traveling direction.

As described above, the second artificial intelligence model may be a model trained to identify a dangerous object which is partially blocked by another object.

Accordingly, even when the part of the dangerous object 20 is blocked by the object 10 as illustrated in FIG. 1, the second processor 140-2 may identify the dangerous object included in an image using the second artificial intelligence model.

In an embodiment, the first processor 140-1 may control the driver based on the distance between the object 10 and the dangerous object 20.

Specifically, if the distance between the object 10 and the dangerous object 20 is equal to or greater than a predetermined value, the first processor 140-1 may control the driver such that the electronic apparatus 100 is allowed to travel in close proximity with the object 10.

In other words, if it is determined that the distance between the object 10 and the dangerous object 20 is relatively far, the first processor 140-1 may control the driver such that the electronic apparatus 100 is allowed to travel in close proximity with the object 10.

This is because, although the dangerous object 20 which is partially blocked by the object 10 is included in the image obtained through the camera 110, if the distance between the object 10 and the dangerous object 20 is equal to or greater than a predetermined value, there is a lower possibility that the electronic apparatus 100 may collide or contact with the dangerous object even if the electronic apparatus 100 travels close to the object 10.

For example, if the predetermined value is 50 cm and it is determined that the distance between the object 10 and the dangerous object 20 is 70 cm, the first processor 140-1 may control the driver such that the electronic apparatus 100 is allowed to travel close to the object 10.

Accordingly, even if the dangerous object 20 is identified on the image, as long as the electronic apparatus 100 does not have a substantial risk of colliding or contacting with the dangerous object 20, the electronic apparatus 100 according to an embodiment may be allowed to travel close to the object 10. In an embodiment, the electronic apparatus 100 may be a robot cleaner and may travel close to the object to absorb any contaminant around the object 10.

If the distance between the object 10 and the dangerous object 20 is less than the predetermined value, the first processor 140-1 may control the driver such that the electronic apparatus 100 is allowed to travel in an area that is at a predetermined distance or greater from the dangerous object 20 located around the object 10.

In other words, if it is determined that the distance between the object 10 and the dangerous object 20 is close and less than the predetermined value, the first processor 140-1 may control the driver such that the electronic apparatus 100 does not approach the dangerous object 20 to be within the predetermined distance or less from the dangerous object 20.

This is because, if the object 10 is adjacent to the dangerous object 20 that is partially blocked by the object 10 in the image and the electronic apparatus 100 travels close to the object 10, there is a risk that the electronic apparatus 100 may collide or contact with the dangerous object 20.

For example, if the predetermined value is 50 cm, and the distance between the object 10 and the dangerous object 20 is 40 cm, the first processor 140-1 may control the driver such that the electronic apparatus 100 travels by avoiding the dangerous object 20.

Accordingly, the electronic apparatus 100 according to an embodiment of the disclosure may identify the dangerous object that is partially blocked by the object 10 in the image, and may be controlled to travel without colliding or contacting with the dangerous object 20.

The first processor 140-1 may determine a distance between the object 10 and the dangerous object 20 based on sensing data received from the sensor 120.

Here, the sensing data may vary according to the type of the sensor 120. For example, if the sensor 120 is implemented as a three-dimensional (3D) camera or a depth camera, the first processor 140-1 may receive an image including depth information from the sensor 120. In this case, the first processor 140-1 may determine a first distance between the electronic apparatus 100 and the object 10 and a second distance between the electronic apparatus 100 and the dangerous object 20 using the depth information, and determine the difference between the first distance and the second distance as the distance between the object 10 and the dangerous object 20.

Alternatively, if the sensor 120 is implemented as a light detection and ranging (LiDAR) sensor, the sensor 120 may irradiate light toward the object 10 and the dangerous object 20, and determine the first distance between the electronic apparatus 100 and the object 10 and the second distance between the electronic apparatus 100 and the dangerous object 20 based on a time when the light reflected from the object 10 and the light reflected from the dangerous object 20 is received. In this case, the first processor 140-1 may receive information regarding the first and second distances from the sensor 120, and determine the difference between the first and second distances as the distance between the object 10 and the dangerous object 20.

The above-described example of the sensor 120 is given only as an example and does not limit the sensor 120. The disclosure may determine the distance between the object 10 and the dangerous object 20 by using various sensors (e.g., an image sensor) capable of calculating a distance to an object or providing information based upon which a distance to an object may be calculated.

As described above, if the object 10 is included in an image captured through the camera 110 and there is no dangerous object 20 included in the image, or the dangerous object 20 away from the object 10 by more than a predetermined distance is included in the image, the electronic apparatus 100 according to an embodiment may efficiently perform a task (e.g., cleaning, etc.) by traveling in close proximity with the object. If the dangerous object 20 away from the object 10 by less than the predetermined distance is included in the image captured through the camera 110, the electronic apparatus 100 may be controlled so as not to approach the object 10 and travel in an area away from the dangerous object 20 by more than the predetermined distance, thereby preventing the dangerous object from being damaged.

Figure 3A:
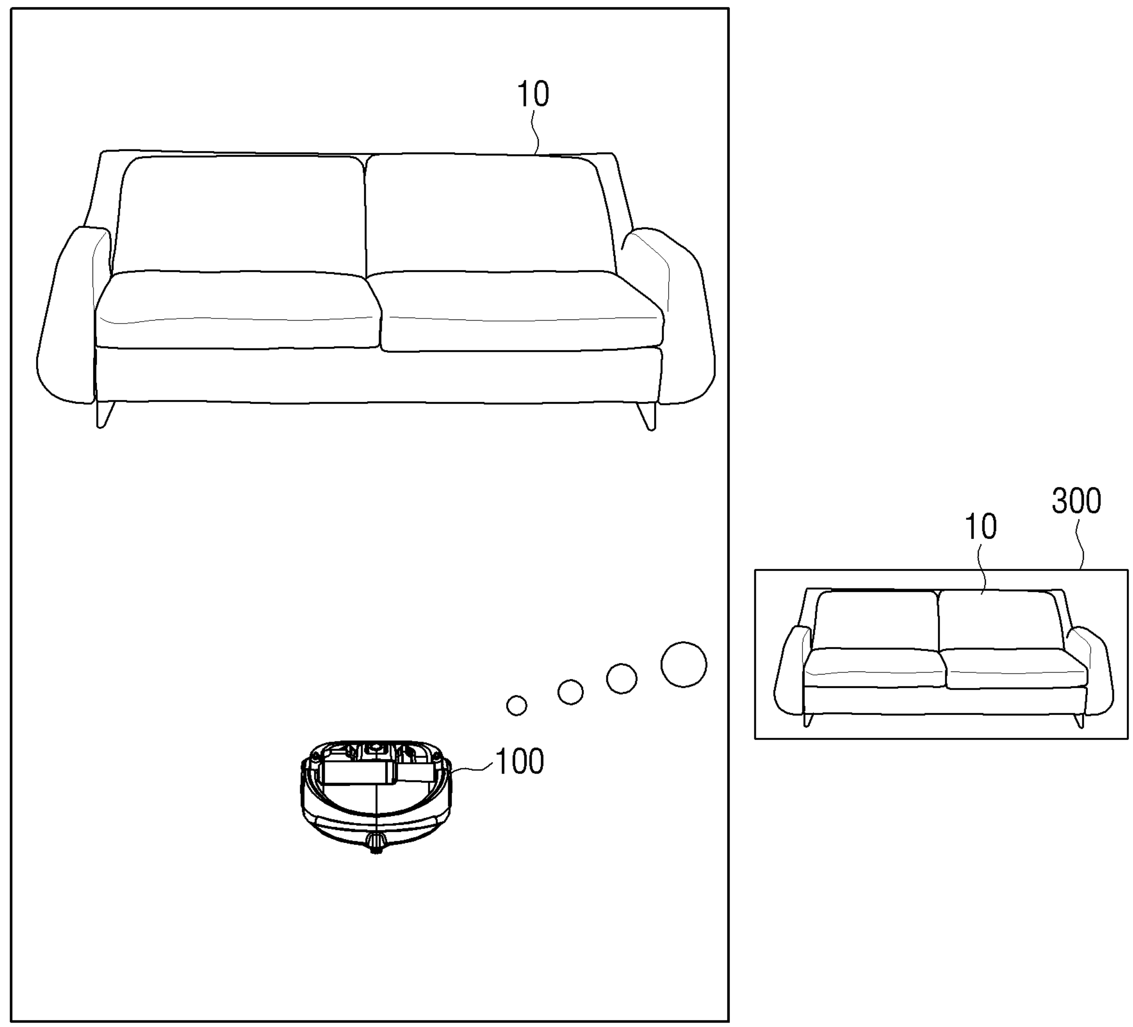
FIG. 3A is a view illustrating an example case in which an object is placed around an electronic apparatus according to an embodiment.
Figure 3B:
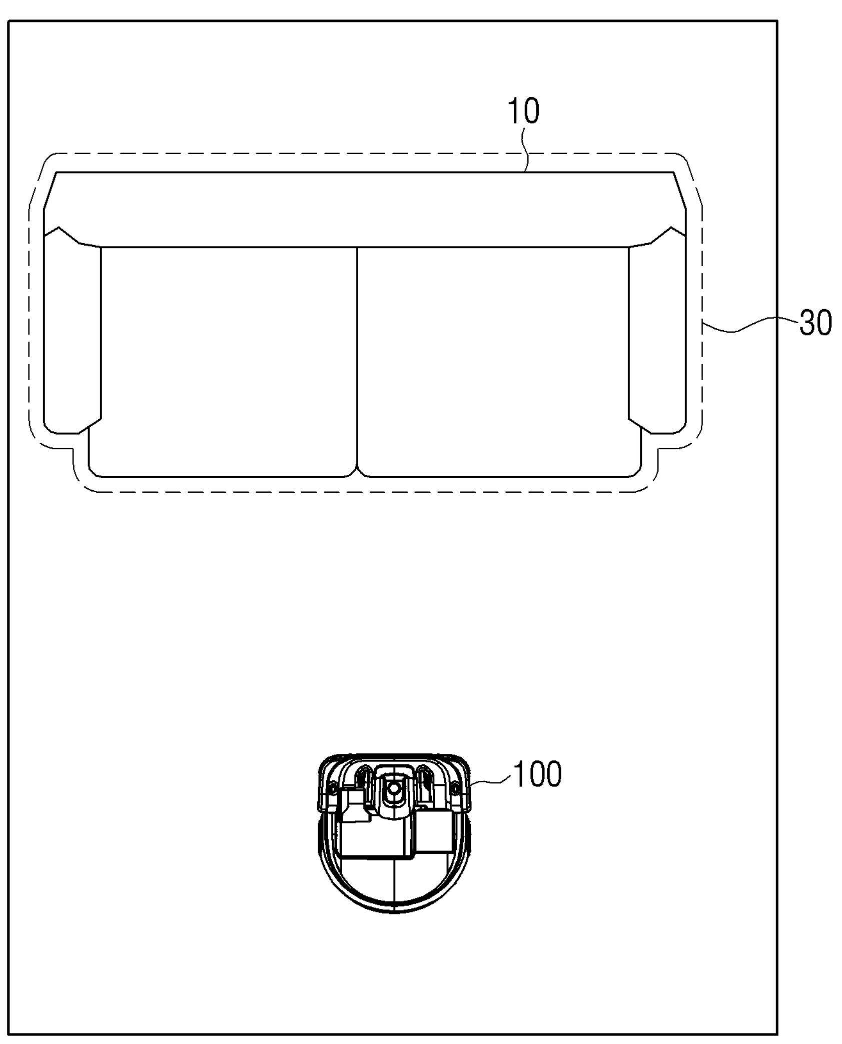
FIG. 3B is a view provided to explain an example of a traveling operation of an electronic apparatus when there is an object around an electronic apparatus according to an embodiment.

FIGS. 3A and 3B are views provided to explain an example of a traveling operation of an electronic apparatus when an object is included in an image obtained through a camera according to an embodiment.

The second processor 140-2 may identify an object included in an image by inputting the image obtained through the camera 110 to the first artificial intelligence model performing object identification. Here, the first artificial intelligence model may be a model trained to identify an object such as a sofa, a TV, a bed, a table, a wardrobe, an air conditioner, a refrigerator, etc. included in the image. In an embodiment, the electronic apparatus 100 is a home appliance (e.g., a robot cleaner), and the first artificial intelligence model may be trained by using sample data of objects that are likely be located in a house such as a sofa, a TV, etc. In other words, the first artificial intelligence model may be trained by using sample data of objects that are based on a type of the electronic apparatus 100.

For example, the second processor 140-2 may identify the object 10 included in an image 300 by inputting the image 300 as illustrated in FIG. 3A, which is obtained through the camera 110, to the first artificial intelligence model.

Accordingly, if there is the object 10 around the electronic apparatus 100 but there is no dangerous object in the image 300, the first processor 140-1 may control the driver such that the electronic apparatus 100 is allowed to travel close to the object 10.

In an embodiment, referring to FIG. 3B, the first processor 140-1 may control the driver such that the electronic apparatus 100 may travel in an area away from the object 10 by a first predetermined distance or greater (e.g., outside of an area denoted by the reference numeral 30).

For example, if the first predetermined distance is set to 1 cm, the first processor 140-1 may control the driver so that the electronic apparatus 100 travels close to the object 10 up to an area that is 1 cm away from the object 10.

Alternatively, the first processor 140-1 may control the driver to travel toward the object 10 until the electronic apparatus 100 contacts the object 10, and when the electronic apparatus 100 comes in contact with the object 10, may control the driver to change the traveling direction of the electronic apparatus 100.

Figure 4A:
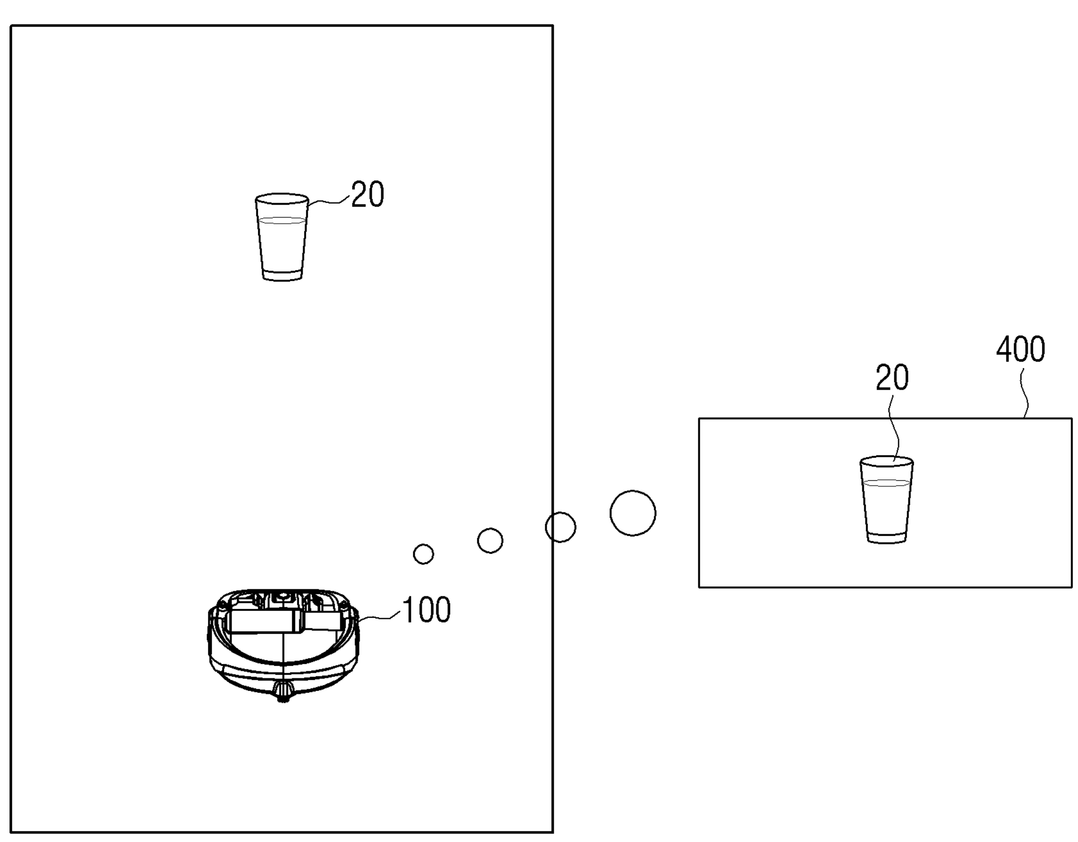
FIG. 4A is a view illustrating an example case in which a dangerous object is placed around an electronic apparatus according to an embodiment.
Figure 4B:
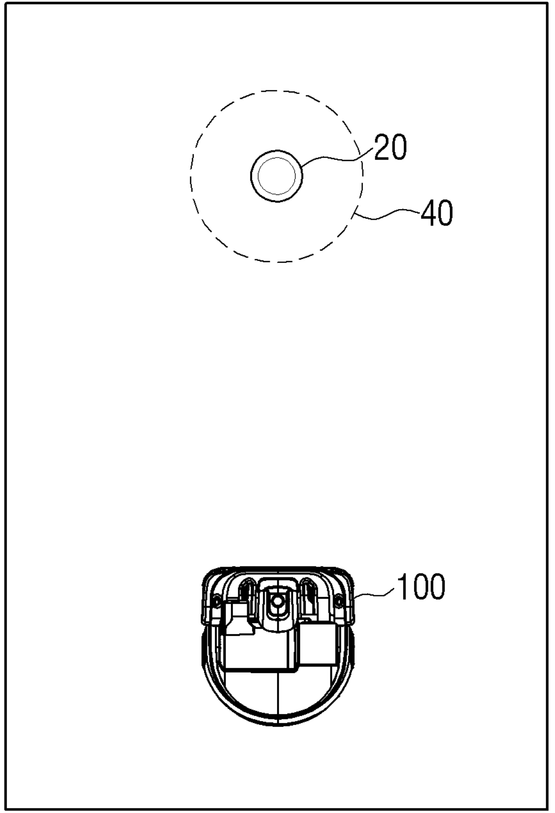
FIG. 4B is view provided to explain an example of a traveling operation of an electronic apparatus when there is a dangerous object around an electronic apparatus according to an embodiment.

FIGS. 4A and 4B are views provided to explain an example of a traveling operation of an electronic apparatus when a dangerous object is included in an image obtained through a camera according to an embodiment.

The second processor 140-2 may identify an object included in the image by inputting the image obtained through the camera 110 to the second artificial intelligence model, which performs identification of a dangerous object. Here, the second artificial intelligence model may be a model trained to identify a dangerous object (e.g., a cup, a flower pot, socks, animal wastes, etc.) included in the image.

For example, the second processor 140-2 may identify the dangerous object 20 included in the image by inputting an image 400 obtained through the camera 110 as illustrated in FIG. 4A to the second artificial intelligence model.

Accordingly, if it is determined that there is the dangerous object 20 around the electronic apparatus 100 included in the image 400, the first processor 140-1 may control the driver to travel by avoiding the dangerous object 20. Here, traveling by avoiding the dangerous object 20 may be traveling in an area spaced apart from the dangerous object 20 by a second predetermined distance or greater. The second predetermined distance may be greater than the first predetermined distance described above.

Specifically, referring to FIG. 4B, the first processor 140-1 may control the driver so that the electronic apparatus 100 travels in an area away from the dangerous object 20 by the second predetermined distance or greater (e.g., outside of an area denoted by the reference numeral 40).

For example, if the second predetermined distance is set to 30 cm, the first processor 140-1 may control the driver so that the electronic apparatus 100 travels up to an area that is 30 cm away from the dangerous object.

FIGS. 5A to 5D are views provided to explain examples of a traveling operation of an electronic apparatus when a dangerous object that is partially blocked by an object is included in an image obtained through a camera according to an embodiment.

The second processor 140-2 may identify an object included in an image by inputting an image obtained through the camera 110 to the first artificial intelligence model that performs object identification, and may identify a dangerous object included in the image by inputting the image obtained through the camera 110 to the second artificial intelligence model that performs dangerous object identification. Here, the dangerous object identified using the second artificial intelligence model may be a dangerous object that is partially blocked by another object.

Figure 5A:
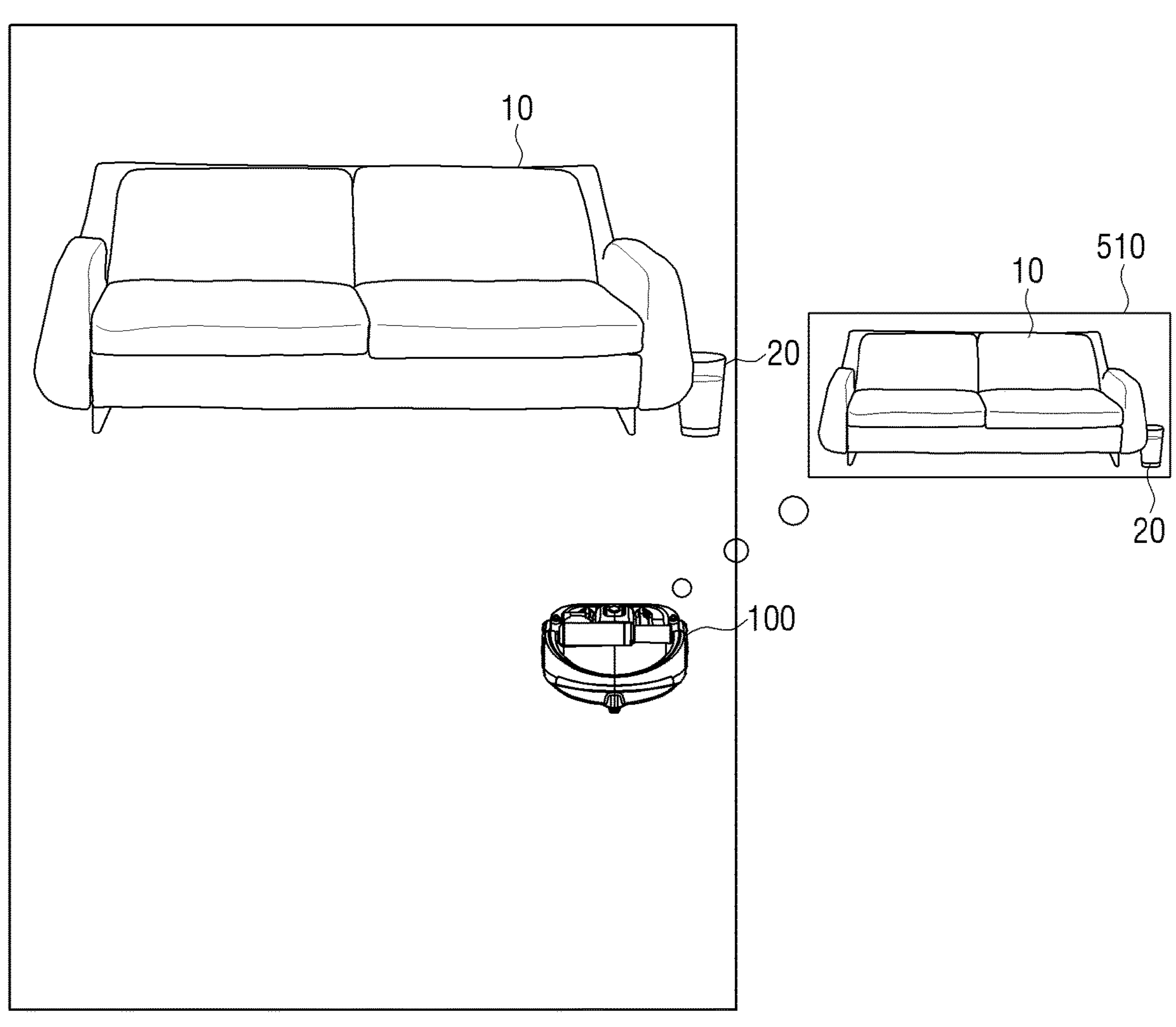
FIG. 5A is a view illustrating a case in which a dangerous object is placed close to an object around an electronic apparatus according to an embodiment.
Figure 5B:
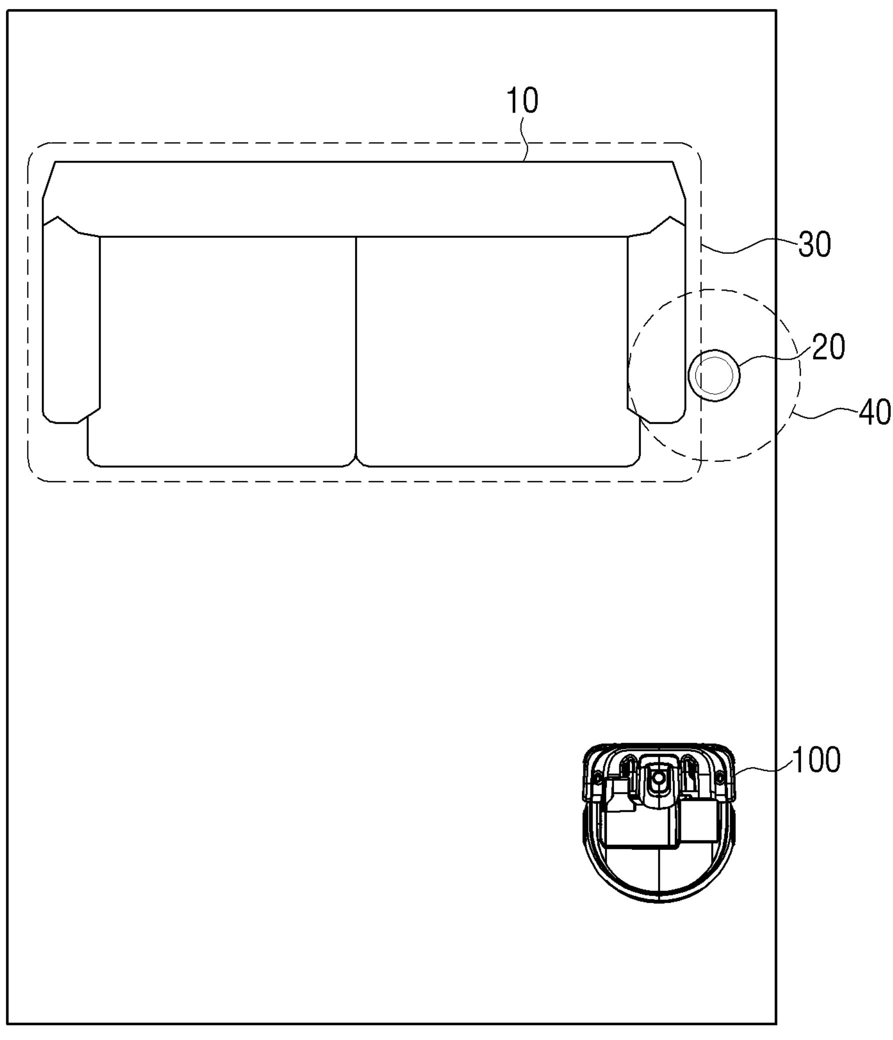
FIG. 5B is a view provided to explain an example of a traveling operation of an electronic apparatus when a dangerous object is placed close to an object around an electronic apparatus according to an embodiment.
Figure 5C:
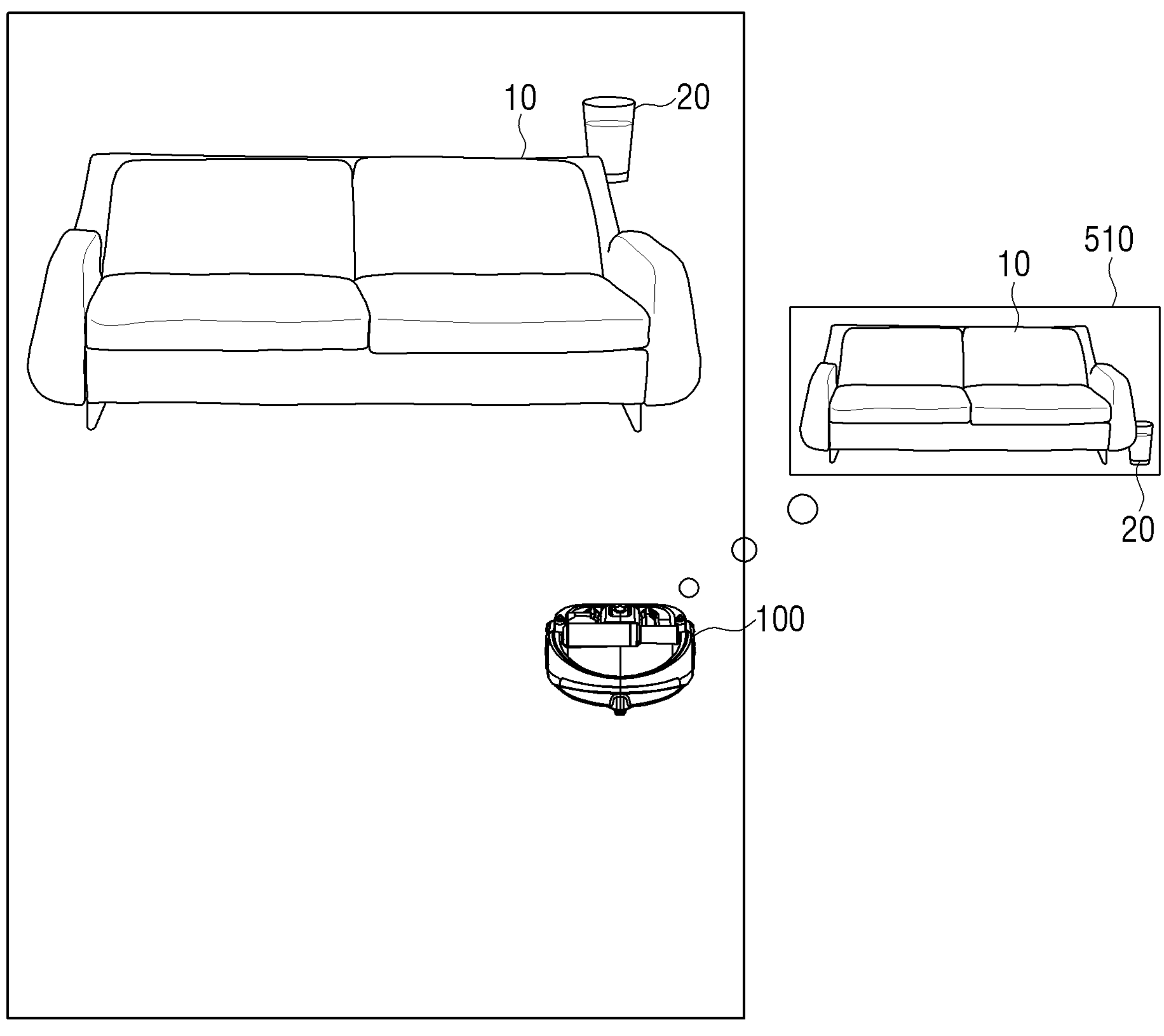
FIG. 5C is a view illustrating a case in which a dangerous object is spaced apart from an object by more than a predetermined distance according to an embodiment.
Figure 5D:
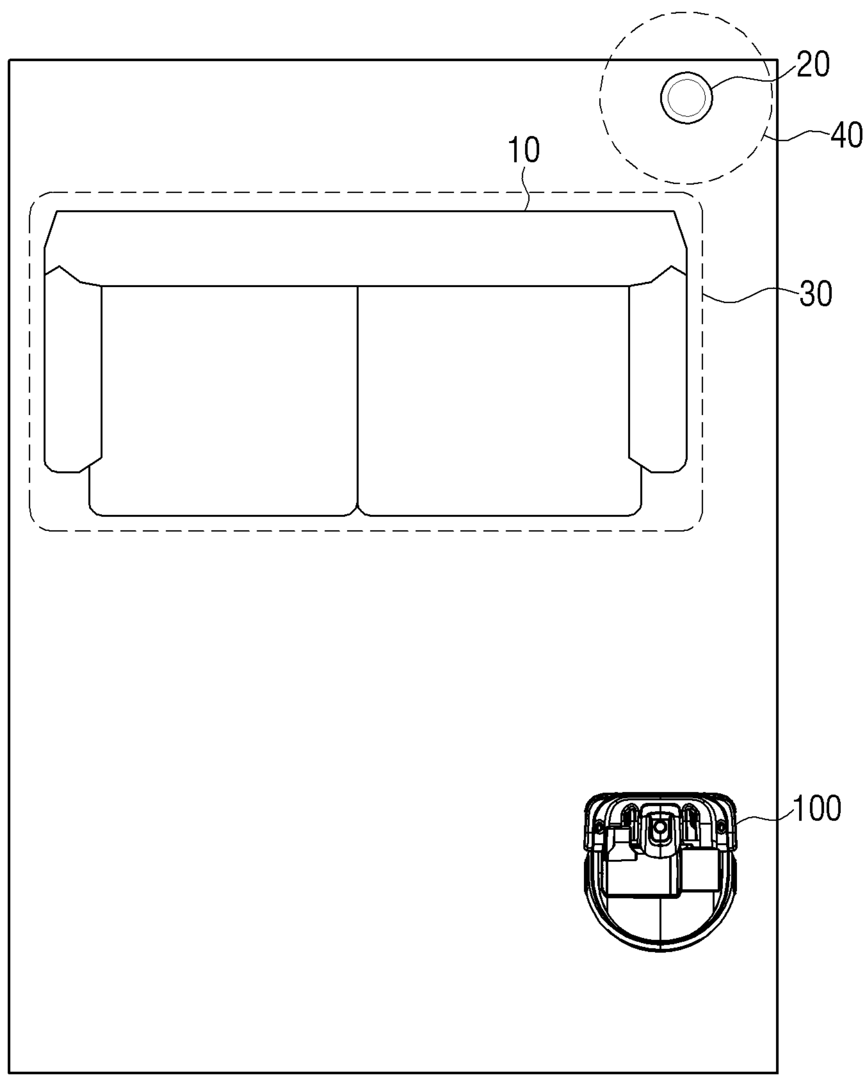
FIG. 5D is a view provided to explain an example of a traveling operation of an electronic apparatus when a dangerous object is spaced apart from an object by more than a predetermined distance according to an embodiment.

For example, the second processor 140-2 may identify an object 10 included in an image by inputting images 510, 520 as illustrated in FIGS. 5A and 5C which are obtained through the camera 110 to the first artificial intelligence model, and may identify a dangerous object 20 partially blocked by the object 10 included in the image by inputting the images 510, 520 obtained through the camera 110 to the second artificial intelligence model.

Based on a determination that there is the dangerous object 20 that is partially blocked by the object 10, the first processor 140-1 may determine a distance between the object 10 and the dangerous object 20 based on sensing data received from the sensor 120.

For example, if the sensor 120 is implemented as a 3D camera or a depth camera, the first processor 140-1 may receive an image including depth information from the sensor 120. The first processor 140-1 may determine a first distance between the electronic apparatus 100 and the object 10 and a second distance between the electronic apparatus 100 and the dangerous object 20 using the depth information, and may determine a difference between the first distance and the second distance as the distance between the object 10 and the dangerous object 20. However, this is only an example, and the first processor 140-1 may determine the distance between the object 10 and the dangerous object 20 using various sensors such as a LiDAR sensor.

If the distance between the object 10 and the dangerous object 20 is less than a predetermined value, the first processor 140-1 may control the driver such that the electronic apparatus 100 travels in an area at a predetermined distance away from the dangerous object 20 which is located around the object 10. Here, the predetermined value may be 50 cm, but is not limited thereto.

For example, as illustrated in FIG. 5A, if the distance between the object 10 and the dangerous object 20 is less than a predetermined value, the first processor 140-1 may control the driver such that the electronic apparatus 100 travels in an area that is the predetermined distance or greater away (e.g., outside of an area denoted by the reference numeral 40) from the dangerous object 20 which is located around the object 10 as illustrated in FIG. 5B.

Accordingly, an electronic apparatus in an embodiment of the disclosure may identify the dangerous object 20 which is partially blocked by the object 10, and control the traveling of the electronic apparatus 100 so that the electronic apparatus 100 does not collide or contact with the dangerous object 20.

If the dangerous object 20 is no longer identified in the image obtained through the camera 110 while the electronic apparatus 100 travels in an area at a predetermined distance or greater away from the dangerous object 20, the first processor 140-1 may control the driver such that the electronic apparatus 100 is allowed to travel close to the object 10.

In an embodiment, the first processor 140-1 may control the driver such that, while the electronic apparatus 100 is allowed to travel in an area outside of an area 30 that is set with reference to the object 10, the electronic apparatus 100 is not allowed to travel in the area 40 that is set with reference to the dangerous object 20. In other words, the first processor 140-1 may control the driver such that, with respect to an area overlapping between the area 30 set with respect to the object 10 and the area 40 set with respect to the dangerous object 20, that the electronic apparatus 100 travels in an area other than the area 30 and the area 40 driver.

With respect to an area other than the overlapping area between the area 30 and the area 40, the first processor 140-1 may control the driver such that the electronic apparatus is allowed to travel close to the area 30. Thus, if the dangerous object 20 is no longer identified in the image obtained through the camera 110, the electronic apparatus 100 may perform a cleaning operation while traveling close to the object 10 (e.g., up to the area 30).

If the distance between the object 10 and the dangerous object 20 is determined to be more than a predetermined value, the first processor 140-1 may control the driver such that the electronic apparatus 100 is allowed to travel close to the object 10.

For example, as illustrated in FIG. 5C, if the distance between the object 10 and the dangerous object 20 is more than a predetermined value, the first processor 140-1 may control the driver such that the electronic apparatus 100 is allowed to travel close to the area 30 which is at the first predetermined distance away from the object 10.

This is because if the dangerous object 20 partially blocked by the object 10 is included in the image obtained through the camera 110 but the distance between the object 10 and the dangerous object 20 is more than a predetermined value, even if the electronic apparatus 100 travels in close proximity with the object 10, there is substantially no or low risk of the electronic apparatus 100 colliding or contacting with the dangerous object 20.

For example, if the predetermined value is 50 cm, and it is determined that the distance between the object 10 and the dangerous object 20 is 70 cm, the driver may be controlled such that the electronic apparatus 100 is allowed to travel close to the object 10.

Accordingly, in an electronic apparatus according to an example of the disclosure, even if the dangerous object 20 is identified, as long as there is substantially no or low risk of the electronic apparatus 100 colliding or contacting with the dangerous object 20, the electronic apparatus 100 may travel close to the object to perform a corresponding task (e.g., absorb contaminants around the object 10).

Figure 6A:
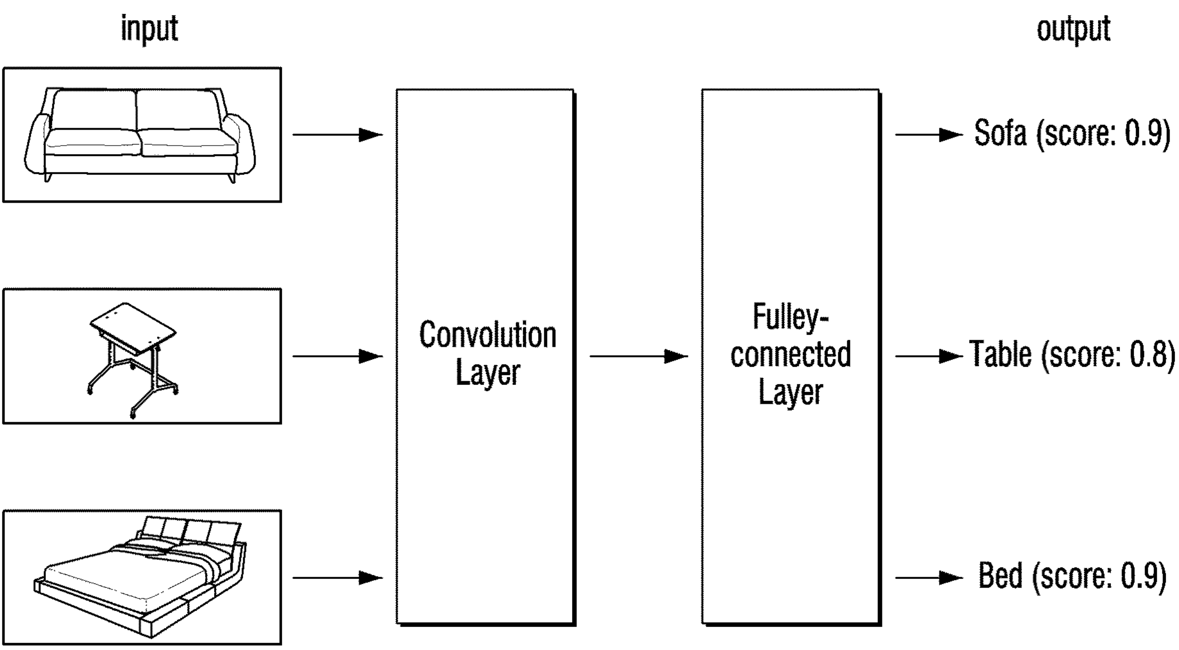
FIG. 6A is a view provided to explain a first artificial intelligence model according to an embodiment.
Figure 6B:
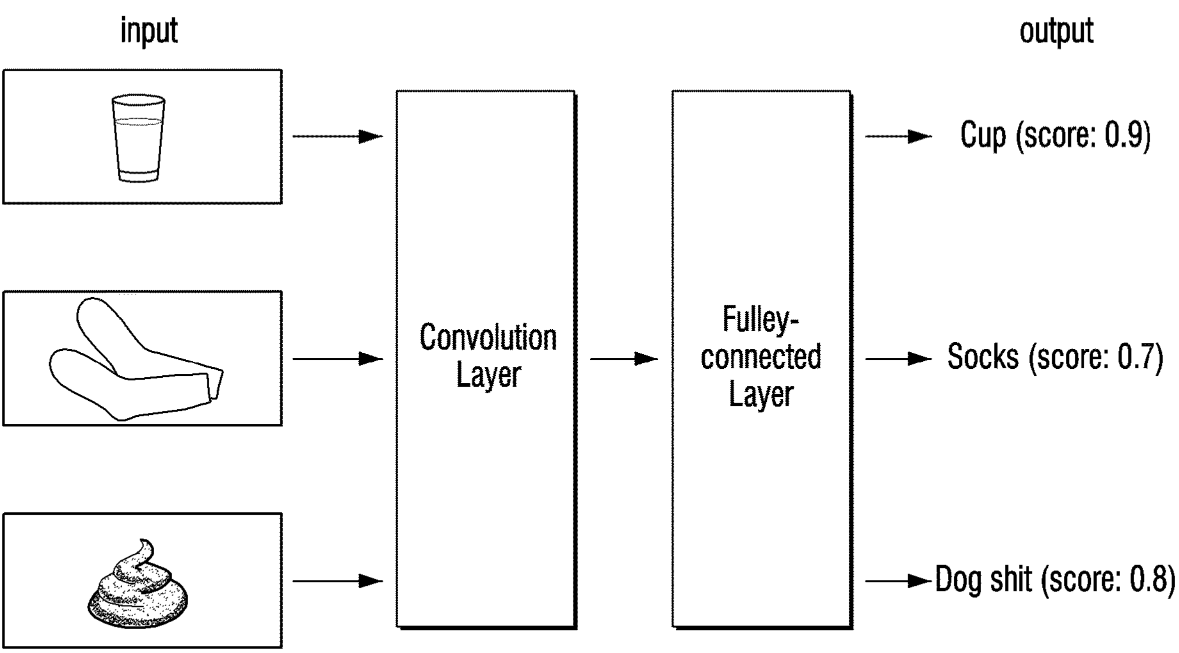
FIG. 6B is a view provided to explain a second artificial intelligence model according to an embodiment.
Figure 6C:
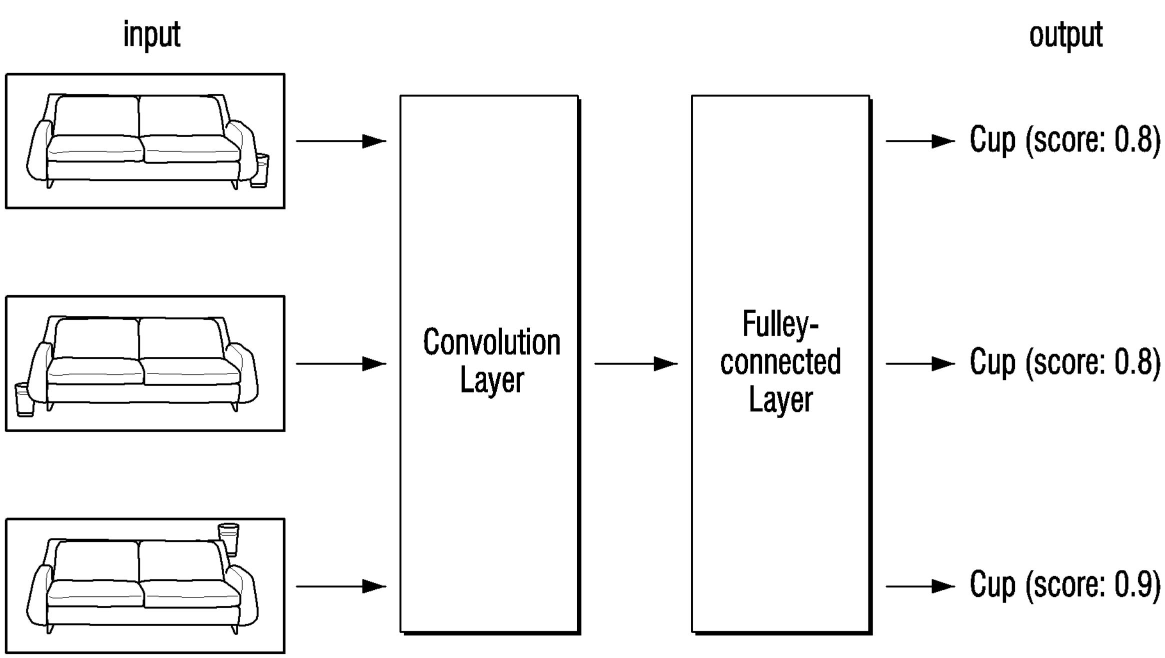
FIG. 6C is a view provided to explain a second artificial intelligence model according to an embodiment.

FIGS. 6A to 6C are views provided to explain first and second artificial intelligence models according to an embodiment.

The first and second artificial intelligence models according to an embodiment may include a plurality of neural layers. Each layer has a plurality of weight values and may perform an operation based on an operation result of the previous layer and the plurality of weight values. For example, the first and the second artificial intelligence models may be a Convolutional Neural Network (CNN), but are not limited thereto. The first and the second artificial intelligence models may be implemented as various artificial intelligence models such as Deep Neural Network (DNN), Recurrent Neural Network (RNN), Restricted Boltzmann Machine (RBM), Deep Belief Network (DBN), Bidirectional Recurrent Deep Neural Network (BRDNN), and Deep Q-Networks.

The first and the second artificial intelligence models may be trained through the electronic apparatus 100 or a separate server and/or system using various learning algorithms. The learning algorithm is an algorithm that trains a predetermined target device (e.g., a robot) using a plurality of learning data to make a decision or make a prediction by itself. The examples of the learning algorithm according to an embodiment include supervised learning, unsupervised learning, semi-supervised learning or reinforcement learning, but are not limited thereto.

Each of the first and the second artificial intelligence models may include a fully-connected layer trained to identify at least one object based on a convolution layer and feature information extracted through the convolution layer.

Here, the convolution layer may be a layer common to the first and the second artificial intelligence models, and the fully-connected layer may be a layer separately provided to each of the first and the second artificial intelligence models.

Each of the fully-connected layers constituting each of the first and the second artificial intelligence models may be a layer trained to identify at least one object from the feature information output from the convolution layer. For example, the fully-connected layer of the first artificial intelligence model may be layer trained to identify an object, and the fully-connected layer of the second artificial intelligence model may be a layer trained to identify a dangerous object.

For example, referring to FIG. 6A, when an image of a sofa, a table, a bed, etc. is input, the first artificial intelligence model may be a model that extracts feature information of the image through a convolution layer and learns a plurality of weight values of a fully-connected layer to identify an object from the feature information output from the convolution layer.

Referring to FIG. 6B, when an image of a cup, socks, dog wastes, etc. is input, the second artificial intelligence model may be a model that extracts feature information of the image through a convolution layer and learns a plurality of weight values of a fully-connected layer to identify a dangerous object from the feature information output from the convolution layer.

In addition, referring to FIG. 6C, when a plurality of images including a cup which is partially blocked by a sofa are input, the second artificial intelligence model may be a model that extracts feature information of the image through a convolution layer and learns a plurality of weight values of a fully-connected layer to identify a dangerous object that is partially blocked by another object from the feature information output from the convolution layer.

In addition, each of the fully-connected layers may output a probability value that at least one object is included in the image for each object.

Here, it is described that the second artificial intelligence model performs learning by inputting an image including a dangerous object and an image including a dangerous object that is partially blocked by an object, but this is only an example.

For example, the model that performs learning by inputting an image including a dangerous object that is partially blocked by an object may be a third artificial intelligence model which is different from the first and the second artificial intelligence models.

In this case, the second processor 140-2 may identify the object in the image by using the first artificial intelligence model, identify the dangerous object in the image by using the second artificial intelligence model, and identify the dangerous object partially blocked by the object in the image by using the third artificial intelligence model.

Here, it is described that the object and the dangerous object are identified using a plurality of artificial intelligence models, but the disclosure according to an embodiment may identify an object and a dangerous object included in an image using one artificial intelligence model.

In this case, the artificial intelligence model may be a model trained to identify an object, a dangerous object, and a dangerous object partially blocked by an object in an image using an image including an object, an image including a dangerous object and an image including a dangerous object partially blocked by an object as input data.

As an example of the electronic apparatus 100 that performs object recognition by using an artificial intelligence model including a convolution layer and a fully-connected layer, the second processor 140-2 may input an image obtained through the camera 110 to the convolution layer. Subsequently, when feature information output through the convolution layer is input to the fully-connected layer, the second processor 140-2 may obtain a probability that an object and/or a dangerous object is included in the image based on data output through the fully-connected layer.

The second processor 140-2 may compare the obtained probability with a threshold value and if the obtained probability is greater than the threshold value, may identify that an object and/or a dangerous object is included in the input image.

The above-described first artificial intelligence model trained to identify an object and the second artificial intelligence model trained to identify a dangerous object that is partially blocked by an object may be pre-stored in the storage 130 of the electronic apparatus 100, and/or received from an external device through communication with the external device (e.g., a server) and stored in the storage 130.

Figure 7A:
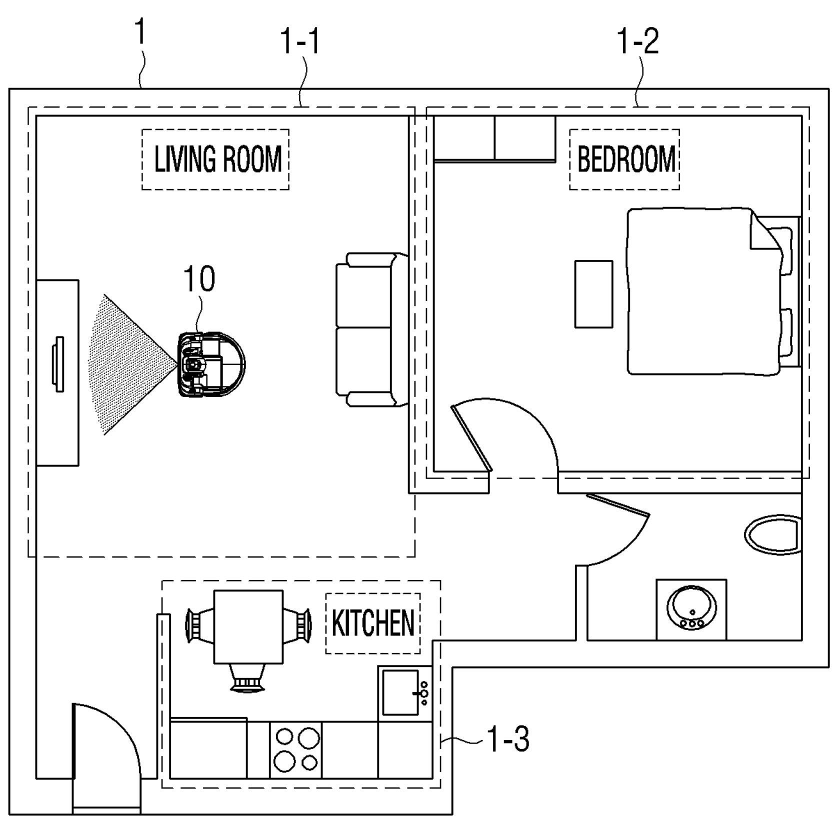
FIG. 7A is a view provided to explain information regarding a map according to an embodiment.
Figure 7B:
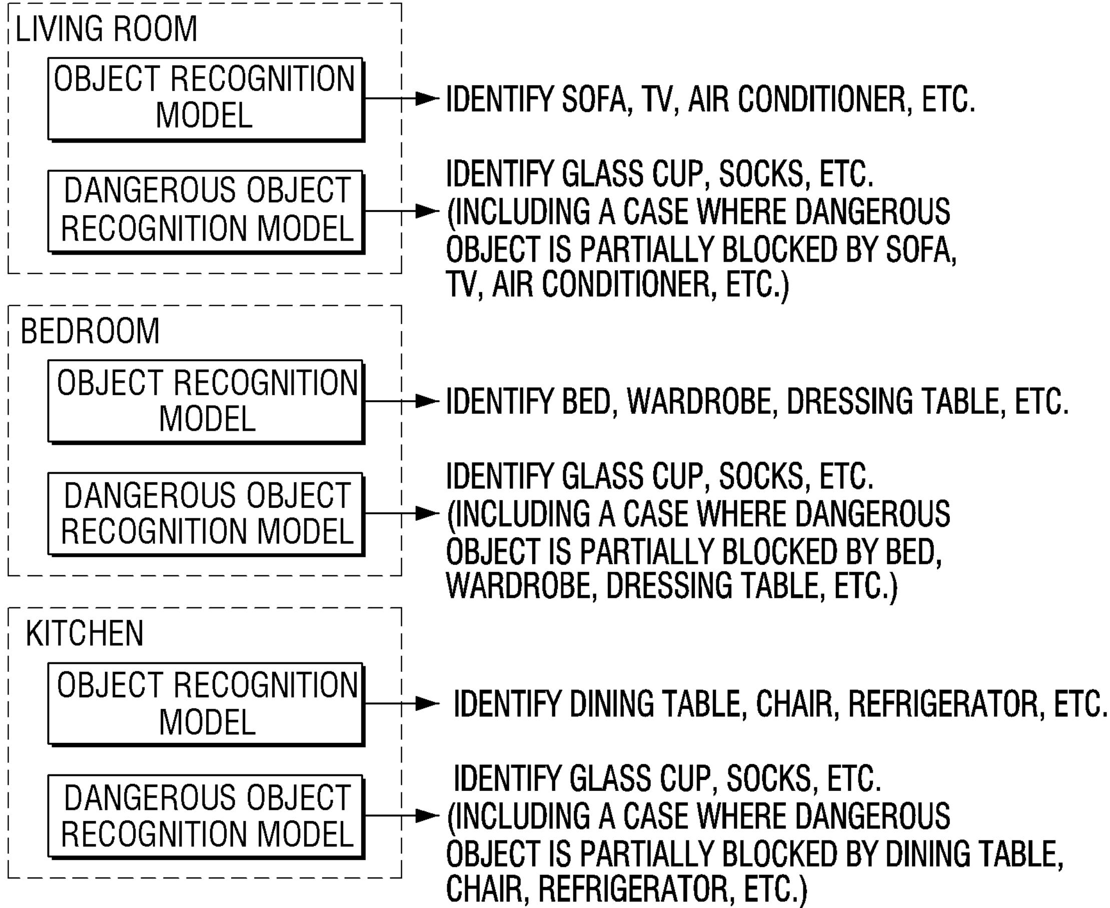
FIG. 7B is a view provided to explain a first artificial intelligence model and a second artificial intelligence model that are divided by each section according to an embodiment.
Figure 7C:
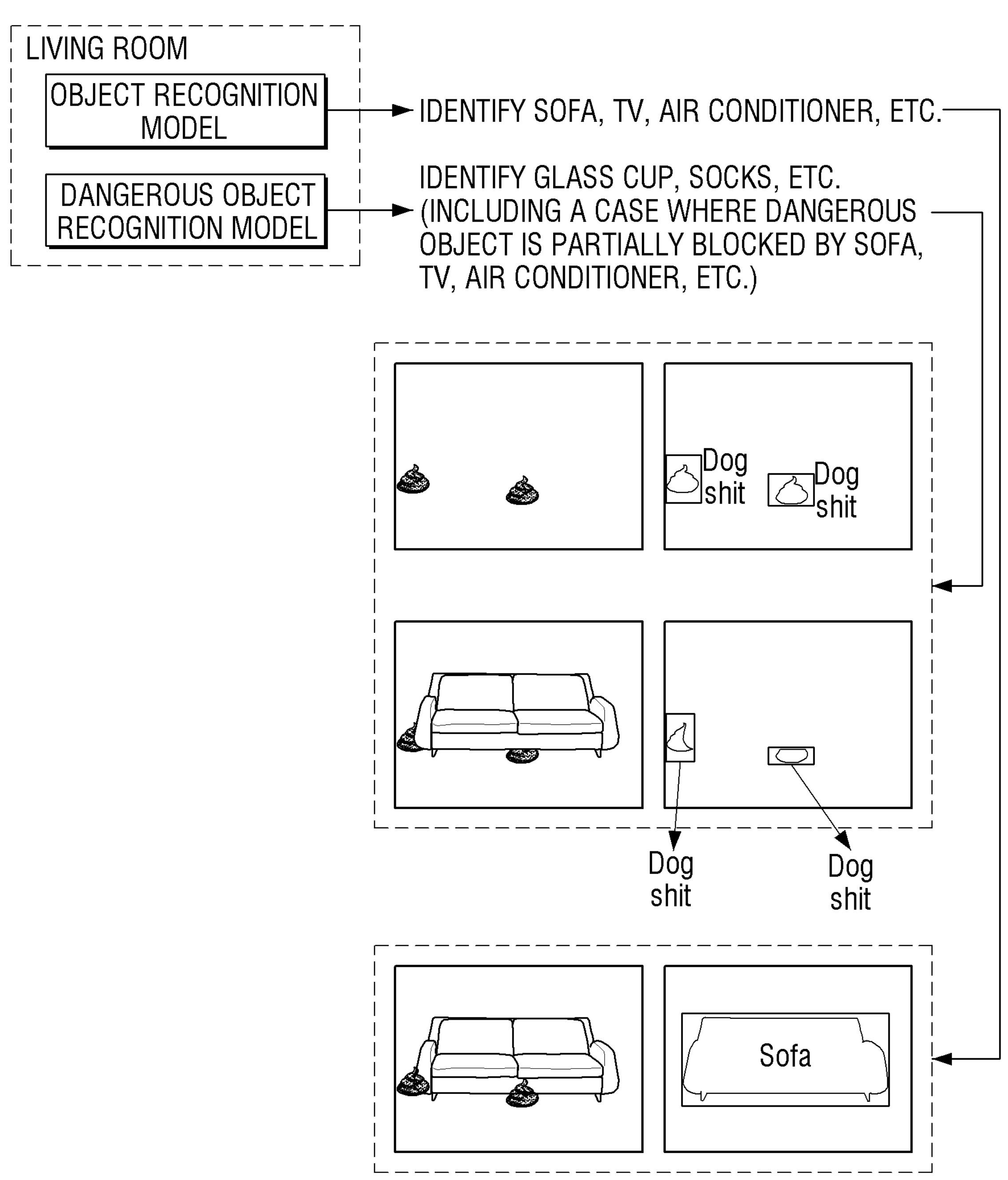
FIG. 7C is a view provided to explain an example embodiment in which an object and/or a dangerous object is identified using a first artificial intelligence model and a second artificial intelligence model according to an embodiment.

FIGS. 7A to 7C are views provided to explain an example embodiment in which an electronic apparatus identifies an object and/or a dangerous object using different artificial intelligence models for each section according to an embodiment.

The storage 130 of the electronic apparatus 100 may store information 131 regarding a map. Here, the map may include a plurality of sections, and information regarding the map may include information regarding the structure of each of the plurality of sections. For example, referring to FIG. 7A, the map includes a living room 1-1, a bedroom 1-2 and a kitchen 103, and the information regarding the map includes information regarding the structure of the living room 1-1, information regarding the structure of the bedroom 1-2 and information regarding the structure of the kitchen 103.

Here, the information regarding the structure of each section may be determined based on the shape, form, and size of each section or the shape, arrangement, etc. of furniture located in the corresponding section. For example, information regarding the structure of the living room 1-1 may be determined based on the shape of the living room 1-1 itself and the shape, arrangement, etc. of an object such as a TV, a sofa, etc. located in the living room 1-1.

The first processor 140-1 may determine a section where the electronic apparatus 100 is located from among a plurality of sections included in the map based on sensing data received from the senor 140.

For example, if the sensor is a LiDAR sensor, the first processor 140-1 may receive sensing data including information regarding the structure of the section where the electronic apparatus 100 is located from the sensor 120. Subsequently, the first processor 140-1 may compare information regarding the structure included in the sensing data with pre-stored information regarding the structure of each section, and determine information regarding a structure consistent with the information regarding the structure included in the sensing data (or a structure included in the sensing data being similar to the structure included in the sensing data included in the pre-stored information) at a degree of a predetermined threshold value or greater from among the pre-stored information regarding a plurality of structures. The first processor 140-1 may determine the section matching the determined structure information as the section where the electronic apparatus 100 is located.

If the sensor 120 is implemented as a 3D camera or a depth camera, the first processor 140-1 may determine the section where the electronic apparatus 100 is located using an image obtained through the 3D camera or the depth camera. In this case, the pre-stored information regarding the map may include information regarding 3D images of each of a plurality of sections.

Specifically, the first processor 140-1 may receive sensing data including information regarding a 3D image from the sensor 120. The first processor 140-1 may compare information regarding the 3D image included in the sensing data with information regarding a 3D image of each section which is pre-stored in the storage, and determine information regarding a 3D image that is consistent with the information regarding the 3D image included in the sensing data at a degree of a predetermined threshold value or greater. Subsequently, the first processor 140-1 may determine the section matching the determined information regarding the 3D image as the section where the electronic apparatus 100 is located.

The above-described embodiment is only an example, and the electronic apparatus according to the disclosure may determine the section where the electronic apparatus 100 is located in various manners. For example, the electronic apparatus 100 may store information regarding an object located at each section, and determine the location of the electronic apparatus 100 based on the section where an identified object is located in an image obtained through the camera 110. For example, if the electronic apparatus 100 stores information regarding a sofa as being matched with a living room and stores information regarding a bed as being matched with a bedroom, when a sofa is identified in an image obtained through the camera 110, the first processor 140-1 may determine that the electronic apparatus 100 is located in the living room, and when a bed is identified in an image obtained through the camera 110, the first processor 140-1 may determine that the electronic apparatus 100 is located in the bedroom. In addition, the first processor 140-1 may transmit information regarding the determined section to the second processor 140-2.

Referring to FIG. 7B, the electronic apparatus 100 may store the first artificial intelligence model (e.g., an object recognition model) and the second artificial intelligence model (e.g., a dangerous object recognition model) which are different from each other for each of a plurality of sections.

Here, the first artificial intelligence model matched to a first section may be a model trained to identify an object that may be located in the first section, and the second artificial intelligence model matched to the first section may be a model trained to identify a dangerous object and/or a dangerous object partially blocked by an object that may be located in the first section. Likewise, the first artificial intelligence model matched to a second section may be a model trained to identify an object that may be located at the second section, and the second artificial intelligence model matched to the second section may be a model trained to identify a dangerous object and/or a dangerous object partially blocked by an object that may be located at the second section. In addition, the first artificial intelligence model matched to a third section may be a model trained to identify a dangerous object and/or an object that may be located at the third section, and the second artificial intelligence model matched to the third section may be a model trained to identify a dangerous object partially blocked by an object that may be located at the third section.

For example, if the first section is a living room, the first artificial intelligence model matched to the first section may be a model trained to identify an object such as a sofa, a TV, an air conditioner, etc. that may be located in the living room, and the second artificial intelligence model matched to the first section may be a model trained to identify a dangerous object such as a cup, socks, etc. that may be located in the living room and/or a dangerous object that may be located in the living room and partially blocked by an object in the image. If the second section is a bedroom, the first artificial intelligence model matched to the second section may be a model trained to identify an object such as a bed, a wardrobe, a dressing table, etc. that may be located in the bedroom, and the second artificial model matched to the second section may be a model may be a model trained to identify a dangerous object such as a cup, socks, etc. that may be located in the bedroom and/or a dangerous object that may be located in the bedroom and partially blocked by an object in the image. If the third section is a kitchen, the first artificial intelligence model matched to the third section may be a model trained to identify an object such as a dining table, a chair, a refrigerator, etc. that may be located in the kitchen, and the second artificial intelligence model matched to the third section may be a model trained to identify a dangerous object such as a cup, socks, etc. that may be located in the kitchen and/or a dangerous object that may be located in the kitchen and partially blocked by an object in the image.

The above-described first to third sections are merely examples, and the name of each section may vary according to an embodiment, and the number of sections may also vary.

The second processor 140-2 determine the first artificial intelligence model corresponding to the section where the electronic apparatus 100 is located from among a plurality of first artificial intelligence models stored in the storage and determine the second artificial intelligence model corresponding to the section where the electronic apparatus 100 is located from among a plurality of second artificial intelligence models stored in the storage.

For example, if the electronic apparatus 100 is located in the living room 1-1, the second processor 140-2 may determine the first artificial intelligence model trained to identify an object such as a sofa, a TV, an air conditioner, etc. that may be located in the living room from among the plurality of first artificial intelligence models and determine the second artificial intelligence model trained to identify a dangerous object such as a cup, socks, etc. that may be located in the living room and/or a dangerous object that may be located in the living room and partially blocked by an object in the image.

Subsequently, by inputting the image obtained through the camera 110 to the determined first artificial intelligence model, the second processor 140-2 may identify an object included in the image, and by inputting the image obtained through the camera 110 to the determined second artificial intelligence model, the second processor 140-2 may identify a dangerous object and/or a dangerous object partially blocked by an object in the image.

For example, referring to FIG. 7C, if it is determined that the electronic apparatus 100 is located in the living room 1-1, the second processor 140-2 may identify the first and the second artificial intelligence models corresponding to the living room 1-1 from among the plurality of first and the second artificial intelligence models, identify an object included in the image by using the first artificial intelligence model, and identify a dangerous object and/or a dangerous object partially blocked by an object included in the image by using the second artificial intelligence model.

Accordingly, by identifying an object and/or a dangerous object using an artificial intelligence model specialized for each section, the electronic apparatus 100 according to an embodiment may identify an object and/or a dangerous object included in an image more accurately. In addition, the artificial intelligence model in each section is a model trained to identify an object that may be located in each section or a dangerous object that may be partially blocked by the object in the image, and may be a lightweight artificial intelligence model compared with an artificial intelligence model trained to identify all objects regardless of location. Thus, the disclosure may minimize the memory burden and the computational burden of the processor.

Figure 8:
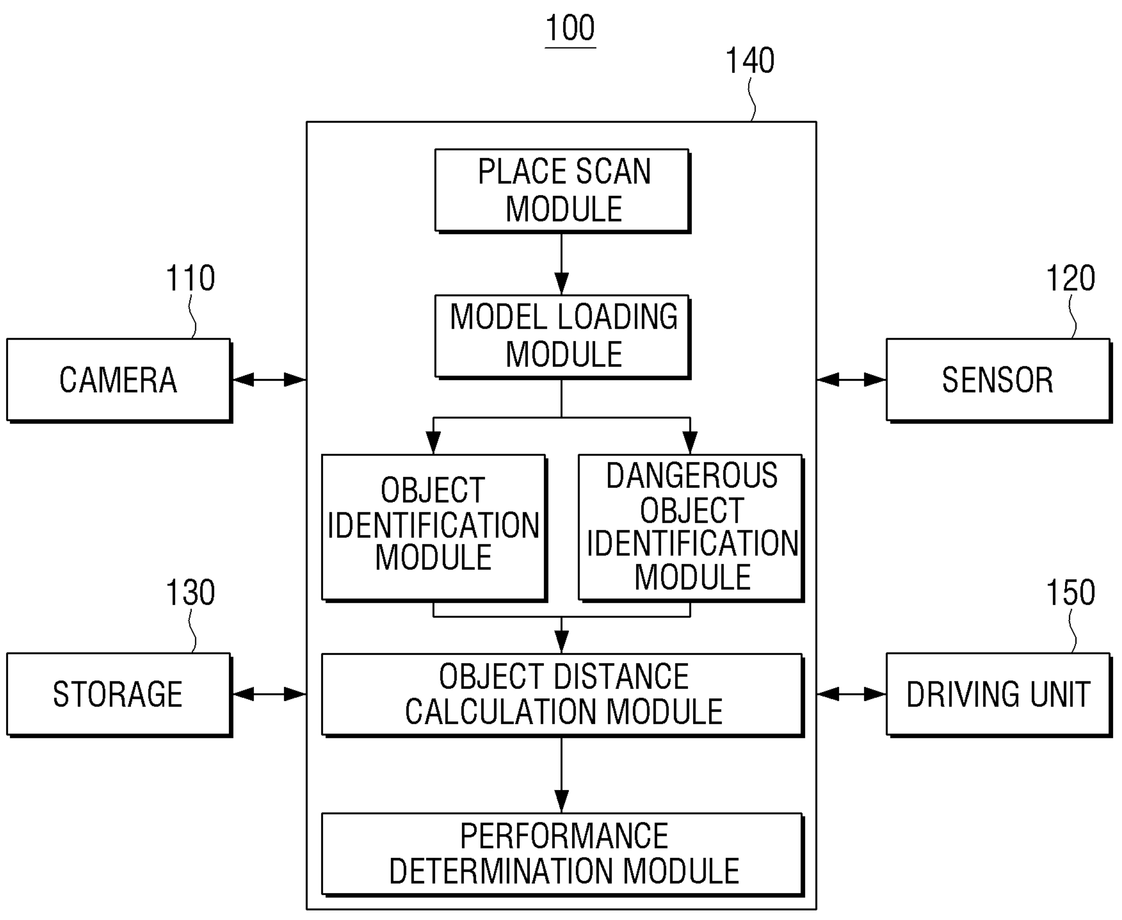
FIG. 8 is a block diagram provided to explain an electronic apparatus according to an embodiment.

FIG. 8 is a block diagram provided to explain the electronic apparatus 100 according to an embodiment.

In the above-described embodiments, it is described that the processor 140 includes the first processor 140-1 and the second processor 140-2, the first processor 140-1 performs the operation of determining the section where the electronic apparatus 100 is located, and the second processor 140-2 performs the operation of identifying an object or a dangerous object, etc. using an artificial intelligence model. However, according to an embodiment, the above-described series of operations may be performed by one processor 140.

Referring to FIG. 8, the electronic apparatus 100 according to an embodiment may include the camera 110, the sensor 120, the storage 130, a driver 150, and the processor 140. Here, the storage 130 may store a place scan module, a model loading module, an object identification module, a dangerous object identification module, an object distance calculation module, and a performance determination module. Each module may be loaded onto a non-volatile memory such as a random access memory (RAM) by the processor 140, and the processor 140 may execute an instruction corresponding to the loaded module.

The processor 140 may determine the place where the electronic apparatus 100 is located by loading the place scan module. Specifically, the processor 140 may load the place scan module and execute an instruction corresponding to the place scan module to receive sensing data from the sensor 120 and determine the section where the electronic apparatus 100 is located from among a plurality of sections included in a map based on the sensing data. Here, the sensing data may be, for example, data obtained by a LiDAR sensor, data obtained by a two-dimensional (2D) camera, or data obtained by a 3D camera, but is not limited thereto.

The processor 140 may load the model loading module to load an artificial intelligence model corresponding to the section where the electronic apparatus 100 is located. Specifically, the processor 140 may load the model loading module and execute an instruction corresponding to the model loading module to load the first and the second artificial intelligence models corresponding to the section where the electronic apparatus 100 is located from among the plurality of first and the second artificial intelligence models stored in the storage 130. For example, if the electronic apparatus 100 is located in the living room, the processor 140 may load the first artificial intelligence model trained to identify an object that may be included in the living room and the second artificial intelligence model trained to identify a dangerous object that may be included in the living room and/or a dangerous object that may be included in the living room and partially blocked by the object in the image.

The processor 140 may load the object identification module and execute an instruction corresponding to the object identification module to input an image obtained through the camera 110 to the first artificial intelligence model and identify an object included in the image. In addition, the processor 140 may load the dangerous object identification module and execute an instruction corresponding to the dangerous object identification module to input an image obtained through the camera 110 to the second artificial intelligence model and identify a dangerous object included in the image. Here, the dangerous object may be any one of a dangerous object that is partially blocked by an object and a dangerous object that is not blocked by an object.

The processor 140 may load the object distance calculation module to determine a distance between an object and a dangerous object. Specifically, the processor 140 may load the object distance calculation module and execute an instruction corresponding to the object distance calculation module to receive sensing data from the sensor and determine a distance between an object and a dangerous object based on the received sensing data. Specifically, the processor 140 may receive information regarding the first distance between the electronic apparatus 100 and an object and the second distance between the electronic apparatus 100 and a dangerous object from the sensor 120, and calculate the difference between the first distance and the second distance. For example, the processor 140 may determine the difference as the distance between the object and the dangerous object. The sensing data here is an example, and may be data obtained by a LiDAR sensor or data obtained by a 3D camera, but is not limited thereto.

The processor 140 may load the performance determination module to control the driver (or driving unit) 150. Specifically, the processor 140 may load the performance determination module and execute an instruction corresponding to the performance determination module to control the traveling of the electronic apparatus 100. For example, if it is determined that the object 10 is included in the image obtained through the camera 110 or the dangerous object 20 is included in an area at more than a first predetermined distance away from the object 10, the processor 140 may control the driver 150 such that the electronic apparatus 100 is allowed to travel close to the object 10. Alternatively, if it is determined that the dangerous object 20 in an area at less than the first predetermined distance away from the object 10 is included in the image obtained through the camera 110, the processor 140 may control the driver 150 such that the electronic apparatus 100 travels in an area at more than a second predetermined distance away from the dangerous object 20.

The storage 130 may store an operating system (OS) for controlling the overall operation of the components of the electronic apparatus 100 and instructions or data related to the components of the electronic apparatus 100.

Accordingly, the processor 140 may control a plurality of hardware or software components of the electronic apparatus 100 using various instructions or data stored in the storage 130, load instructions or data received from at least one of the other components onto a memory and process the loaded instructions or data, and store various data in a non-volatile memory.

In particular, the storage 130 may store the first and the second artificial intelligence models. As described above, the first artificial intelligence model here may be a model for identifying an object included in an image, and the second artificial intelligence model may be a model for identifying a dangerous object and/or a dangerous object partially blocked by an object included in the image. In addition, the storage 130 may store the first and the second artificial intelligence models for each of a plurality of sections.

Figure 9A:
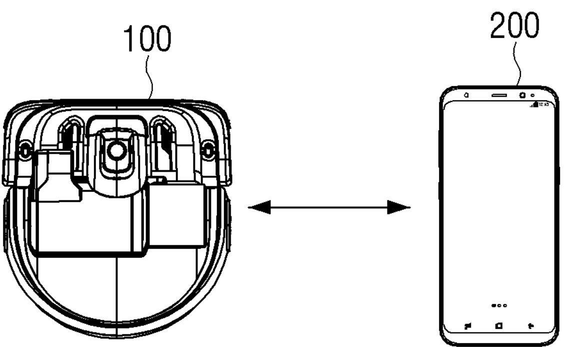
FIG. 9A is a view illustrating an electronic apparatus and an external apparatus according to an embodiment.
Figure 9B:
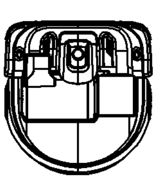
FIG. 9B is a view provided to explain update of an artificial intelligence model according to an embodiment.
Figure 9B:
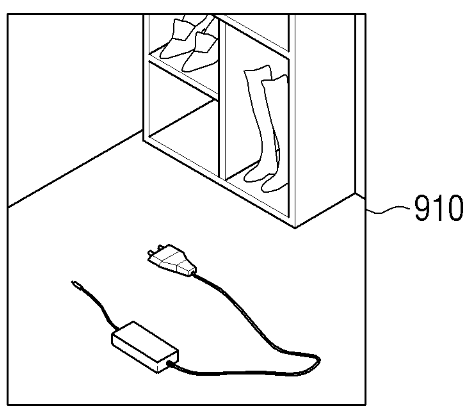
Figure 9B:
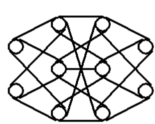
Figure 9B:
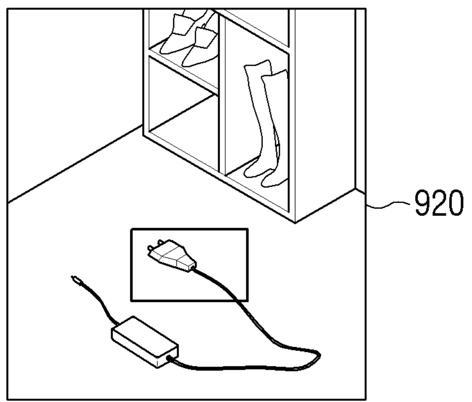
Figure 9B:
Figure 9B:
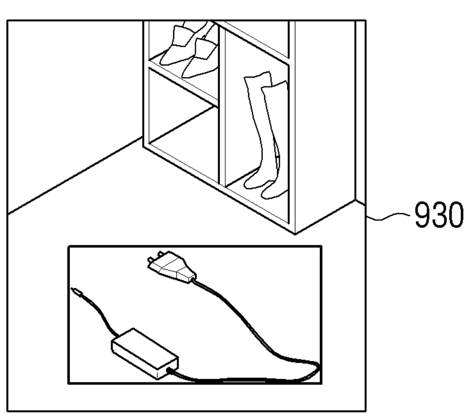

FIGS. 9A and 9B are views provided to explain an update of an artificial intelligence model according to an embodiment.

The electronic apparatus 100 may perform communication with an external apparatus 200 and transmit and/or receive various data.

The electronic apparatus 100 may further include a communicator (or a communication interface) for performing communication with the external apparatus 200. In an embodiment, the communicator may be implemented as a Bluetooth chip, a Wi-Fi Chip and/or a wireless communication chip.

The external apparatus 200 may be implemented as a smart phone as illustrated in FIG. 9A, but is not limited thereto. The external apparatus 200 may be implemented as various electronic apparatuses having a display such as a personal computer (PC), a notebook computer, a tablet, etc.

The processor 140 may input an image obtained through the camera 110 to an artificial intelligence model. In this case, the first artificial intelligence model may output a probability that an object is be included in the image, and the second artificial intelligence model may output a probability that a dangerous object is be included in the image.

For example, as illustrated in FIG. 9B, when an image 910 including an electric wire is input to the second artificial intelligence model, the second artificial intelligence model may output a probability that the electric wire is included in the image.

In this case, the processor 140 may transmit data output by the artificial intelligence model to the external apparatus 200 through a communicator. Here, the data transmitted to the external apparatus 200 may include information regarding an area where an object and/or a dangerous object is located in the image, which is determined by the artificial intelligence model and information regarding a probability that an image and/or a dangerous object is included in the image. Here, the information regarding the area may include information regarding the coordinates of a bounding box corresponding to an object and/or a dangerous object as shown in an image 920. However, the disclosure is not limited thereto, and the information regarding the area may include segmentation information corresponding to an object and/or a dangerous object in the image.

The external apparatus 200 may display the area where an object and/or a dangerous object is located in the image and the probability that an object and/or a dangerous object is included in the image based on data received from the electronic apparatus 100.

For example, referring to FIG. 9B, the external apparatus 200 may display a bounding box on an area where an electric wire is located in an image 930 based on information regarding the coordinates of the bounding box in the image 920 received from the electronic apparatus 100, and display 0.3 as the probability that the electric wire is included in the corresponding image.

The external apparatus 200 may receive a user input for changing the area where an object and/or a dangerous object is located in the image or a user input for changing the object and/or dangerous object determined by an artificial intelligence model.

For example, referring to FIG. 9B, the external apparatus 200 may receive a user input with respect to the image 930 for changing the size or location of the displayed bounding box. Alternatively, if a thread, not an electric wire, is actually included in the image, the external apparatus 200 may receive a user input for changing the electric wire to the thread.

The external apparatus 200 may transmit information regarding the area where an object and/or a dangerous object is located in the image, which is changed according to a user input, to the electronic apparatus 100. In addition, the external apparatus 200 may transmit information regarding an object and/or a dangerous object which is changed according to a user input to the electronic apparatus 100. In addition, the external apparatus 200 may transmit information regarding the changed area and information regarding the changed object and/or dangerous object together to the electronic apparatus 100.

The processor 140 may update an artificial intelligence model by inputting information regarding the changed area received from the external apparatus 200 to the artificial intelligence model. In this case, the artificial intelligence model may update the weight values of a plurality of layers in order to determine that an object and/or a dangerous object is included in the changed area in the image. Alternatively, the processor 140 may update the artificial intelligence model by inputting information regarding the changed object and/or dangerous object to the artificial intelligence model. In this case, the artificial intelligence model may update the weight values of the plurality of layers in order to determine that the changed object and/or dangerous object is included in the image.

Accordingly, the electronic apparatus 100 according to the disclosure may identify an object and/or a dangerous object more accurately.

The processor 140 may determine whether the probability that an object and/or a dangerous object is included in an image is less than a predetermined probability and if so, may transmit data output by an artificial intelligence model to the external apparatus 200 through a communicator.

Here, the predetermined probability may be 0.4, but is not limited thereto. The predetermined probability may be set in various ways.

For example, if the probability that an electric wire is included in an image is output as 0.3 by the second artificial intelligence model, the processor 140 may transmit the data output by the second artificial intelligence model as described above to the external apparatus 200 through a communicator, and if the probability that an electric wire is included in an image is output as 0.5 by the second artificial intelligence model, the processor 140 may not transmit the data output by the second artificial intelligence model to the external apparatus 200.

This is because if the output of the artificial intelligence model has a sufficiently high probability, the artificial intelligence model may not need to be updated and accordingly, the disclosure may prevent unnecessary computation of a processor.

Figure 10:
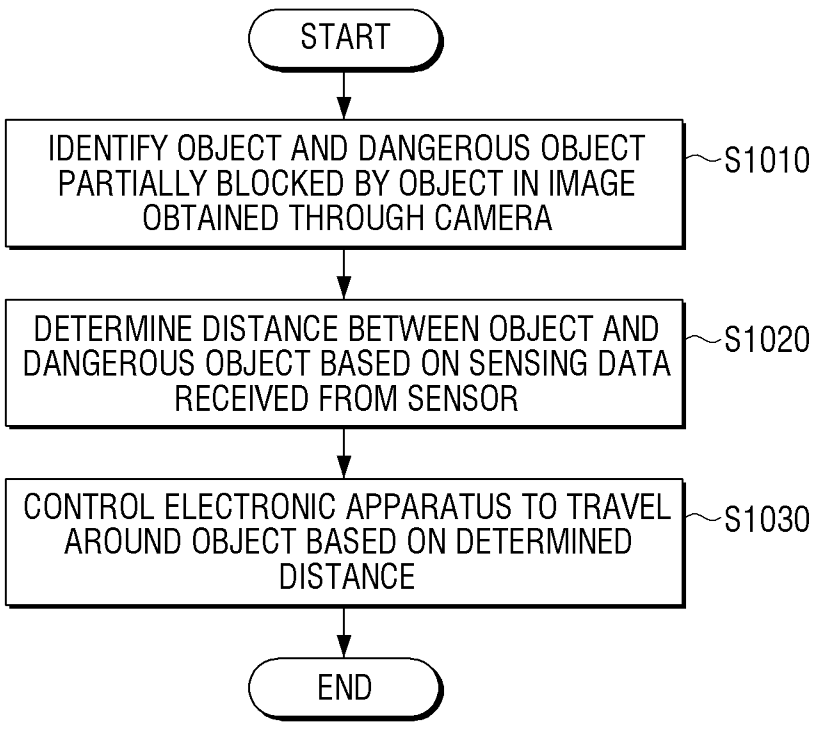
FIG. 10 is a flowchart provided to explain a controlling method of an electronic apparatus according to an embodiment.

FIG. 10 is a flowchart provided to explain a controlling method of an electronic apparatus according to an embodiment.

An electronic apparatus according to an embodiment may identify an object and a dangerous object partially blocked by the object in an image obtained through a camera (S1010). Specifically, the electronic apparatus may identify an object in the image by inputting a first image obtained through a camera to the first artificial intelligence model, and may identify a dangerous object partially blocked by the object in the image by inputting a second image obtained through a camera to the second artificial intelligence model. In an embodiment, the first image used in identifying the object and the second image used in identifying the dangerous object partially blocked may be the same or different from each other.

The electronic apparatus may determine a distance between an object and a dangerous object based on sensing data received from a sensor (S1020). Specifically, the electronic apparatus may determine the first distance between the electronic apparatus and the object and the second distance between the electronic apparatus and the dangerous object based on the sensing data received from the sensor, and determine a distance between the object and the dangerous object based on the first distance and the second distance.

The electronic apparatus may be controlled to travel around the object based on the determined distance (S1030). Specifically, if the distance between the object and the dangerous object is equal to or greater than a predetermined value, the electronic apparatus may be controlled to travel close to the object, and if the distance between the object and the dangerous object is less than the predetermined value, the electronic apparatus may be controlled to travel an in area at an predetermined distance or greater away from the dangerous object which is located around the object.

According to the above-described various embodiments, there may be provided an electronic apparatus capable of identifying a dangerous object even if the dangerous object is partially not viewable in the image (e.g., blocked by another object) and traveling by avoiding the dangerous object and a controlling method thereof.

The methods according to the above-described various embodiments may be implemented in the form of software or an application that may be installed in an electronic apparatus.

In addition, the methods according to the above-described various embodiments may be implemented only by software upgrade or hardware upgrade with respect to the existing electronic apparatus.

Further, the above-described various embodiments of the disclosure may be performed through an embedded server provided in an electronic apparatus or an external server of the electronic apparatus.

A non-transitory computer readable medium storing a program which sequentially performs the controlling method of an electronic apparatus according to an embodiment may be provided.

The non-transitory computer-readable medium refers to a medium that stores data semi-permanently, and is readable by a device, but not a medium that stores data for a short moment such as a register, a cache, and a memory. Specifically, the above-described various applications or programs may be stored in a non-transitory computer-readable medium such as a CD, a DVD, a hard disc, a blue-ray disc, a USB, a memory card, a ROM and the like and provided therein.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While the disclosure has been particularly illustrated and described with reference to example embodiments thereof, it will be understood that various changes in form and details may be made therein without departing from the spirit and scope of the following claims.

What is claimed is:

1. An electronic apparatus, which travels based on map information and an object recognition result, the electronic apparatus comprising:

a camera;

a communication interface;

a driver;

at least one processor comprising processing circuitry; and at least one memory storing instructions that, when executed by the at least one processor individually or collectively, cause the electronic apparatus to:

capture an image while the electronic apparatus travels based on the map information;

obtain an object recognition result for the image;

transmit, to an external device, information regarding the image according to the object recognition result;

receive, from the external device, information regarding a user feedback on the object recognition result to update an object recognition model, wherein the external device displays the obtained image while receiving the user feedback; and control the electronic apparatus such that the electronic apparatus travels according to the received information regarding the user feedback.

2. The electronic apparatus according to claim 1, wherein the instructions, when executed by the at least one processor individually or collectively, cause the electronic apparatus to:

update the object recognition model based on the received information regarding the user feedback.

3. The electronic apparatus according to claim 2, wherein the instructions, when executed by the at least one processor individually or collectively, cause the electronic apparatus to:

obtain a second image after the object recognition model is updated;

obtain, through the updated object recognition model, a second object recognition result for the second image; and control the electronic apparatus such that the electronic apparatus travels based on the second object recognition result.

4. The electronic apparatus according to claim 1, wherein the image comprises a first area corresponding to an object and a second area around the object.

5. The electronic apparatus according to claim 4, wherein the information regarding the image comprises information regarding a location of the first area, and wherein the information regarding the location of the first area comprises information regarding a bounding box indicating the first area.

6. The electronic apparatus according to claim 5, wherein the instructions, when executed by the at least one processor individually or collectively, cause the electronic apparatus to:

based the object recognition result indicating that the object corresponds to a plurality of predefined object, control the electronic apparatus such that the electronic apparatus travels through the second area; and based the object recognition result indicating that the object does not correspond to the plurality of predefined object, transmit the information regarding the image to the external device.

7. The electronic apparatus according to claim 6, wherein the information regarding the user feedback comprises information for changing the object recognition results obtained by the object recognition model or information for changing the information regarding the location of the first area.

8. The electronic apparatus according to claim 7, wherein the instructions, when executed by the at least one processor individually or collectively, cause the electronic apparatus to:

based on the information regarding the user feedback indicating that the object corresponds a first type, control the electronic apparatus such that the electronic apparatus travels through the second area; and based on the information regarding the user feedback indicating that the object corresponds a second type different from the first type, control the electronic apparatus such that the electronic apparatus travels at a predetermined distance away from the second area.

9. A method of controlling an electronic apparatus, which travels based on map information and an object recognition result, the method comprising:
 capturing an image while the electronic apparatus travels based on the map information;
 obtaining an object recognition result for the image;
 transmitting, to an external device, information regarding the image according to the object recognition result;
 receiving, from the external device, information regarding a user feedback on the object recognition result to update an object recognition model, wherein the external device displays the obtained image while receiving the user feedback; and
 controlling the electronic apparatus such that the electronic apparatus travels according to the received information regarding the user feedback.

10. The method according to claim 9, wherein the method further comprises:
 updating the object recognition model based on the received information regarding the user feedback.

11. The method according to claim 10, wherein the method further comprises:
 obtaining a second image after the object recognition model is updated;
 obtaining, through the updated object recognition model, a second object recognition result for the second image; and
 controlling the electronic apparatus such that the electronic apparatus travels based on the second object recognition result.

12. The method according to claim 9, wherein the image comprises a first area corresponding to an object and a second area around the object.

13. The method according to claim 12,
 wherein the information regarding the image comprises information regarding a location of the first area; and
 wherein the information regarding the location of the first area comprises information regarding a bounding box indicating the first area.

14. The method according to claim 13, wherein the method further comprises:
 based the object recognition result indicating that the object corresponds to a plurality of predefined object, controlling the electronic apparatus such that the electronic apparatus travels through the second area; and
 based the object recognition result indicating that the object does not correspond to the plurality of predefined object, transmitting the information regarding the image to the external device.

15. The method according to claim 14, wherein the information regarding the user feedback comprises information for changing the object recognition results obtained by the object recognition model or information for changing the information regarding the location of the first area.

16. The method according to claim 15, wherein the method further comprises:
 based on the information regarding the user feedback indicating that the object corresponds a first type, controlling the electronic apparatus such that the electronic apparatus travels through the second area; and
 based on the information regarding the user feedback indicating that the object corresponds a second type different from the first type, controlling the electronic apparatus such that the electronic apparatus travels at a predetermined distance away from the second area.

* * * * *